US009062667B2

(12) United States Patent
Ophardt et al.

(10) Patent No.: US 9,062,667 B2
(45) Date of Patent: Jun. 23, 2015

(54) VARIABLE VOLUME BORE PISTON PUMP

(71) Applicant: GOTOHTI.COM INC., Beamsville (CA)

(72) Inventors: Heiner Ophardt, Arisdorf (CH); Andrew Jones, Smithville (CA); Zhenchun Shi, Hamilton (CA)

(73) Assignee: GOTOHTI.COM INC., Beamsville (CA)

( * ) Notice: Subject to any disclaimer, the term of this patent is extended or adjusted under 35 U.S.C. 154(b) by 23 days.

(21) Appl. No.: 13/801,761

(22) Filed: Mar. 13, 2013

(65) Prior Publication Data

US 2014/0099224 A1 Apr. 10, 2014

(30) Foreign Application Priority Data

Mar. 30, 2012 (CA) ..................................... 2773201

(51) Int. Cl.
*G01F 11/00* (2006.01)
*F04B 19/00* (2006.01)
*B05B 11/00* (2006.01)
*A47K 5/12* (2006.01)

(52) U.S. Cl.
CPC ............. *F04B 19/00* (2013.01); *B05B 11/0054* (2013.01); *B05B 11/3008* (2013.01); *B05B 11/3066* (2013.01); *B05B 11/3069* (2013.01); *A47K 5/1207* (2013.01)

(58) Field of Classification Search
CPC B05B 11/306; B05B 11/3064; B05B 11/307; B05B 11/0054; B05B 11/3007; B05B 11/3008; B05B 11/3011; B05B 11/3066; B05B 11/3069; F04B 53/102; F04B 19/00
USPC .............. 222/133, 168.5, 249, 250, 309, 319, 222/340, 342, 387, 402.14, 402.19, 402.24, 222/402.25, 181.1, 207, 321.7–321.9; 137/15.26, 315.08, 493.9; 417/545, 417/550, 552, 546, 547
See application file for complete search history.

(56) References Cited

U.S. PATENT DOCUMENTS

| | | | | |
|---|---|---|---|---|
| 5,489,044 | A * | 2/1996 | Ophardt | 222/1 |
| 5,975,360 | A * | 11/1999 | Ophardt | 222/83 |
| 6,409,050 | B1 | 6/2002 | Ophardt et al. | |
| 6,557,736 | B1 | 5/2003 | Ophardt | |
| 7,267,251 | B2 * | 9/2007 | Ophardt | 222/321.9 |
| 7,303,099 | B2 | 12/2007 | Ophardt | |
| 7,959,037 | B2 | 6/2011 | Ophardt | |
| 8,157,134 | B2 | 4/2012 | Ophardt | |
| 8,365,965 | B2 | 2/2013 | Ophardt | |
| 8,413,855 | B2 | 4/2013 | Ophardt et al. | |
| 8,474,664 | B2 | 7/2013 | Ophardt et al. | |
| 8,528,792 | B2 | 9/2013 | Ophardt et al. | |
| 2009/0200341 | A1 | 8/2009 | Oden et al. | |
| 2011/0014076 | A1 | 1/2011 | Shi et al. | |

* cited by examiner

*Primary Examiner* — Frederick C Nicolas
*Assistant Examiner* — Bob Zadeh
(74) *Attorney, Agent, or Firm* — Thorpe North & Western, LLP

(57) ABSTRACT

In a piston pump having a piston axially slidable in a chamber in a piston chamber forming body between a one-way inlet valve and an axially spaced one-way outlet valve to dispense fluid, an arrangement for varying the volume of the chamber by varying the axial location of the one-way inlet valve within the chamber by engagement of the one-way inlet valve with the piston to move the one-way inlet valve to different axially spaced locations within the chamber.

19 Claims, 24 Drawing Sheets

VARIABLE VOLUME BORE PISTON PUMP

SCOPE OF THE INVENTION

This invention relates generally to piston pumps and, more particularly, to a piston pump assembly having a variable piston chamber length and, therefore, a variable volume bore.

BACKGROUND OF THE INVENTION

Fluid dispensers are known utilizing piston pumps to dispense fluids with movement of a piston through a full piston stroke. The present inventors have appreciated that such known dispensers suffer disadvantages when the piston is moved through a lesser stroke than the full piston stroke, particularly when the lesser stroke commences at the same extended position but travels inwardly a lesser extent than in a full piston stroke. These disadvantages include difficulties in dispensing fluid proportionate to the stroke length and difficulties in initial priming of the pump so as to replace air in the pump chamber with liquid.

SUMMARY OF THE INVENTION

To at least partially overcome these disadvantages of known dispensers and pumps, the present invention provides a pump assembly for dispensing liquids with a variable piston chamber length.

An object of the present invention is to provide a configuration for a piston pump which permits advantageous operation over both short stroke piston movement and long stroke piston movement.

Another object of the present invention is to provide a pump for dispensing liquids from a reservoir, comprising:

a piston-chamber forming body having a cylindrical chamber, said chamber having a chamber wall, an outer open end and an inner end in fluid communication with the reservoir, a piston forming element slidably received in the chamber having an inner end in the chamber and an outer end which extends outwardly from the open end of the chamber, a one-way inlet valve in the chamber inwardly of the piston forming element permitting fluid flow outwardly in the chamber past the inlet valve and preventing fluid flow inwardly in the chamber past the inlet valve, a one-way outlet valve carried on the piston forming element proximate the inner end of the piston forming element permitting fluid flow outwardly in the chamber past the outlet valve and preventing fluid flow inwardly in the chamber past the outlet valve, the inlet valve coaxially slidable inwardly in the chamber from an outer position displaced from the inner end of the chamber toward at least one inner position closer to the inner end of the chamber than the outer position, the inlet valve and the piston-chamber forming body coupled to each other to prevent relative coaxial sliding of the inlet valve in the chamber under forces experienced due to pressures developed across the inlet valve in normal operation of the pump to dispense fluid, wherein on engagement of the inner end of the piston forming element with the inlet valve the piston forming element the inner end of the piston forming element the inlet valve coaxially slides inwardly with the inner end of the piston forming element.

Another object of the present invention is to provide a pump for dispensing liquids from a reservoir, comprising:

a piston-chamber forming body having a cylindrical chamber, said chamber having a chamber wall, an outer open end and an inner end in fluid communication with the reservoir, a piston forming element slidably received in the chamber having an inner end in the chamber and an outer end which extends outwardly from the open end of the chamber, a one-way inlet valve in the chamber inwardly of the piston forming element permitting fluid flow outwardly in the chamber past the inlet valve and preventing fluid flow inwardly in the chamber past the inlet valve, a one-way outlet valve carried on the piston forming element proximate the inner end of the piston forming element permitting fluid flow outwardly in the chamber past the outlet valve and preventing fluid flow inwardly in the chamber past the outlet valve, the outlet valve coaxially slidable relative to the piston forming element outwardly relative the piston forming element from an inner position to an outer position which outer position is displaced outwardly from the outer end of the piston forming element a lesser extent than the inner position is displaced outwardly from the outer end of the piston forming element, the outlet valve and the piston forming element coupled to each other to prevent relative coaxial sliding of the outlet valve relative the piston forming element under forces experienced due to pressures developed across the outlet valve in normal operation of the pump to dispense fluid, wherein on inward sliding of the piston forming element, engagement of the outlet valve with the a stop member carried on the piston-chamber forming body, the outlet valve coaxially slides inwardly relative the piston forming element.

Another object of the present invention is to provide a pump for dispensing liquids from a reservoir, comprising:

a piston-chamber forming element having a cylindrical chamber, said chamber having a chamber wall, an outer open end and an inner end in fluid communication with the reservoir, a piston forming element slidably received in the chamber having an inner end in the chamber and an outer end which extends outwardly from the open end of the chamber, a one-way inlet valve in the chamber inwardly of the piston forming element permitting fluid flow outwardly in the chamber past the inlet valve and preventing fluid flow inwardly in the chamber past the inlet valve, a one-way outlet valve carried on the piston forming element proximate the inner end of the piston forming element permitting fluid flow outwardly in the chamber past the outlet valve and preventing fluid flow inwardly in the chamber past the outlet valve, wherein one of the inlet valve and the outlet valve comprises a dose adjusting member, a first of the piston chamber forming body and piston forming element comprising a base member, and the other, a second of the piston chamber forming body and the piston forming element comprising a setting member, (a) when the inlet valve comprises the dose adjusting member, the base member comprises the piston chamber forming body, then (i) the inlet valve is coaxially slidable inwardly in the chamber from an outer position displaced from the inner end of the chamber toward at least one inner position closer to the inner end of the chamber than the outer position, and (ii) the inlet valve and the piston chamber forming body are coupled to each other to prevent relative coaxial sliding of the inlet valve in the chamber under forces experienced due to pressures developed across the inlet valve in normal operation of the pump to dispense fluid, (b) when the outer valve comprises the dose adjusting member and the base member comprises the piston forming element, then (i) the outlet valve is coaxially slidable relative to the piston forming element outwardly relative the piston forming element from an inner position to an outer position which outer position is displaced outwardly from the outer end of the piston forming element a lesser extent than the inner position is displaced outwardly from the outer end of the piston forming element, and (ii) the outlet valve and the piston forming element engaging each other to prevent relative coaxial sliding of the outlet valve relative the piston forming element under forces experienced due to pressures developed across the outlet valve in normal operation of the pump to dispense fluid, wherein on inward sliding of the piston forming element, with engagement between the dose adjusting member and the setting member, the dose adjusting member coaxially slides inwardly relative the base member.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

Figure 3:
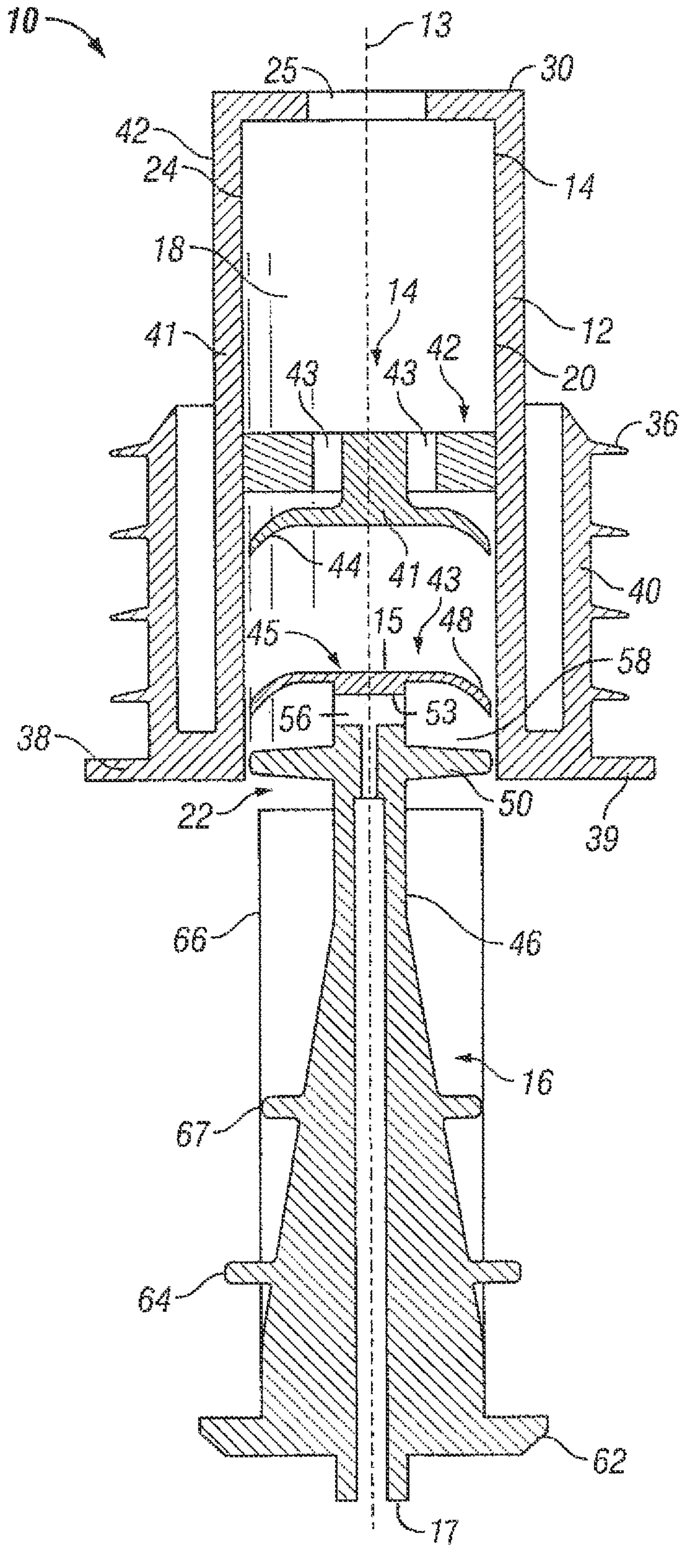
FIG. 3 is a cross-sectional side view of a first embodiment of the pump assembly shown in FIG. 1 with an inlet valve in a short stroke position and the piston in a fully extended position.
Figure 4:
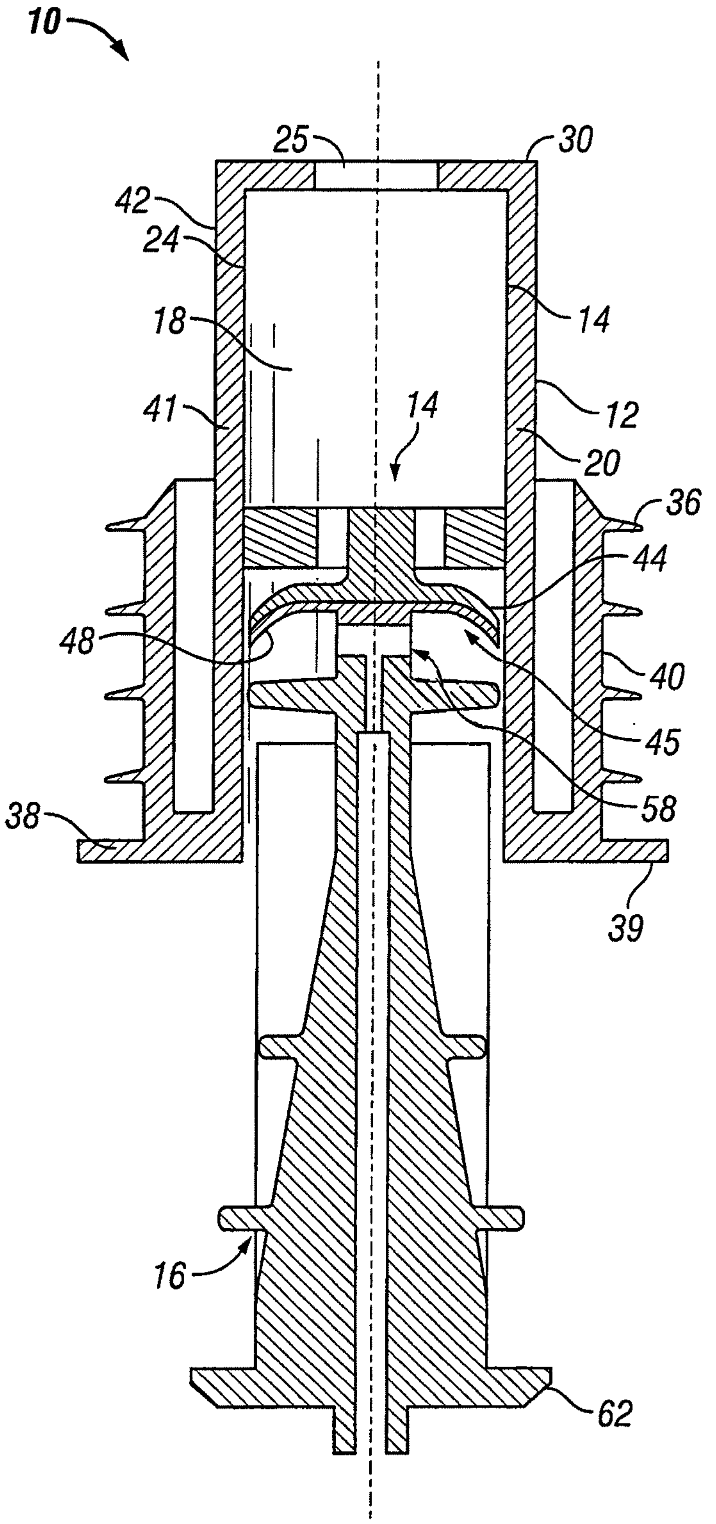
FIG. 4 is a cross-sectional side view the same as FIG. 3 with the inlet valve in the short stroke position but with the piston in a fully retracted position for a short stroke.

Reference is made first to FIGS. 3 and 4 which show a pump assembly generally indicated 10. Pump assembly 10 is best shown in FIG. 3 as comprising three principle elements, a piston chamber forming body 12, a one-way valve 14 and a piston 16.

Body 12 has a cylindrical inner chamber 18 with the one-way valve 14 coaxially received in the chamber 18. Piston 16 is axially slidably received in chamber 18 for reciprocal sliding movement inwardly and outwardly of an open end 22 of chamber 18 along a central axis 13. Body 12 not only carries the one-way valve 14 and piston 16 but is also adapted to be frictionally engaged into a cylindrical neck 34 of the fluid reservoir 26 shown in FIG. 1. With the pump assembly 10 coupled to reservoir 26, reciprocal movement of piston 16 will pump fluid from the reservoir 26 through piston 16.

Figure 2:
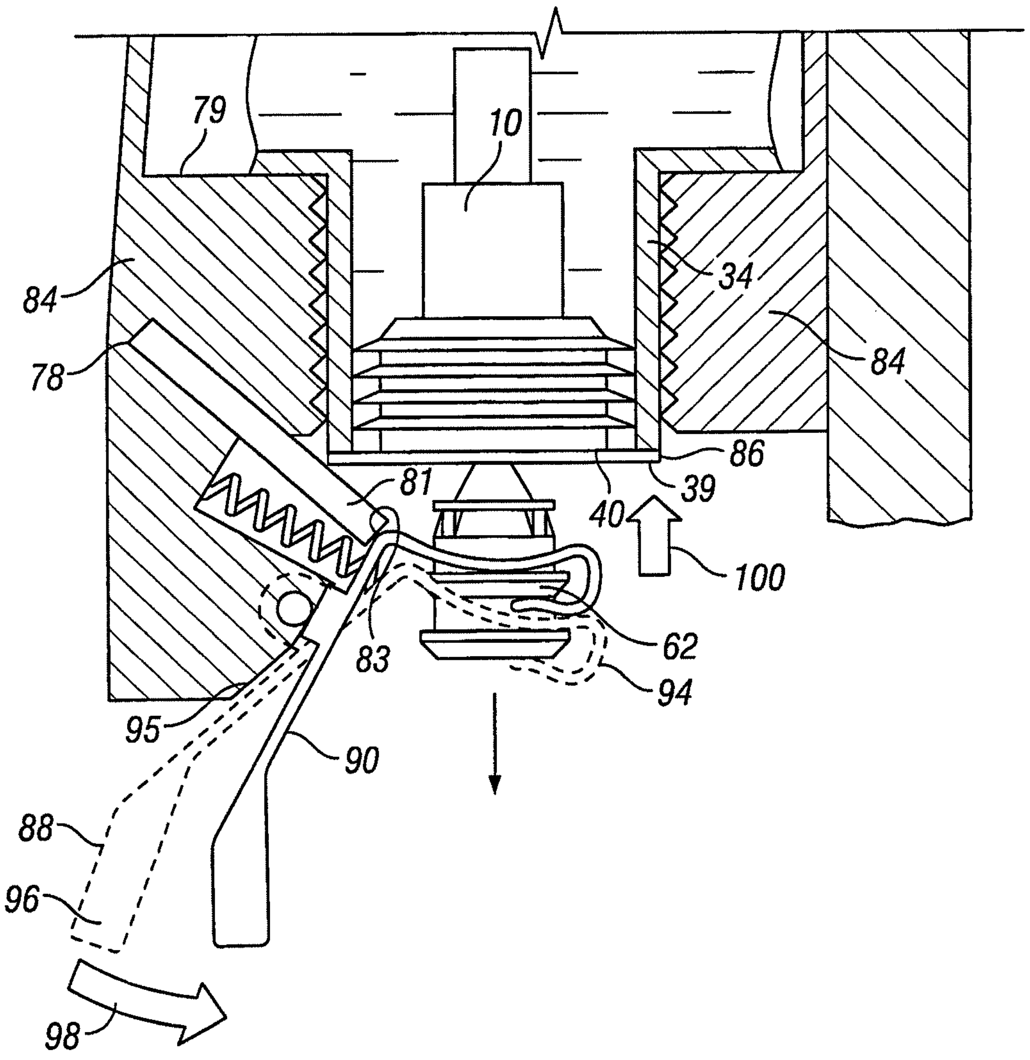
FIG. 2 is a partial side view of the reservoir and pump assembly of FIG. 1 but showing a removable actuator stop member.

As seen in FIG. 2, body 12 is generally cylindrical in cross-section and symmetrical about its central axis 13. Body 12 has an inner cylindrical portion 41 forming the chamber 18 and, disposed coaxially thereabout and spaced therefrom an outer cylindrical portion 40. The inner and outer cylindrical portions are joined by a disc-like rim 38 extending radially outwardly about open end 22 of chamber 18. Sealing and gripping flanges 36 are provided about the outer cylindrical portion 40 to assist in frictionally engaging the inner surfaces of reservoir neck 34 and form a fluid impermeable seal therewith. Rim 38 continues radially outwardly past flanges 36 as stop flange 39 which serve to limit insertion of body 12 into reservoir neck 34.

Chamber 18 is disposed coaxially within inner cylindrical portion 41, with the chamber 18 terminating at an inner end 24 at a radially inwardly extending inner shoulder 30 with a central opening 25 therethrough.

One-way inlet valve 14 comprises a central support or stem member now referred to as an annular ring 42 with two circular openings 43 therethrough on opposite sides of the central axis 13. The center of the annular ring 42 extends axially outwardly as a post portion 43 from which an inlet flexing disc 44 extends radially outwardly to engage the chamber wall 20. The inlet flexing disc 44 engages the chamber wall 20 so as to prevent fluid flow inwardly therepast, however, with the inlet flexing disc 44 having a flexible edge portion which is deformable to permit fluid to pass outwardly therepast. In assembly, the one-way valve 14 is slidably inserted into the chamber 18. Preferably, one-way valve 14 is formed entirely of plastic and is formed by injection molding.

The annular ring 42 of the inlet valve 14 is sized relative to the diameter of the inner chamber 18, such that the annular ring 42 is engaged by the inner chamber wall 20 in a tight friction fit relation which resists coaxial sliding. The annular ring 42 is, however, coaxially slidable in the inner chamber 18 under forces greater than the frictional forces between a radially outwardly directed outer cylindrical surface of the annular ring 42 and the radially inwardly directed surface of the cylindrical inner chamber wall 20.

As best seen in FIG. 2, piston 16 is generally cylindrical in cross-section and adapted to be slidably received in chamber 18 with an inner end 15 in the chamber 18 and an outer end 17 extending out of the open end 22 of the chamber 18. Piston 16 is a unitary element formed entirely of plastic preferably by injection molding. Piston 16 has a central hollow stem 46 extending along the central longitudinal axis of the piston 16. A resilient outlet flexing disc 48 is located at the inwardmost end of the piston 16 and extends radially therefrom. Outlet flexing disc 48 is sized to circumferentially abut the cylindrical inner chamber wall 20 to substantially prevent fluid flow outwardly therebetween. The outlet flexing disc 48 has a flexible edge portion which is deformable to permit fluid to pass outwardly therepast. The flexing disc 48 forms a one-way outlet valve 45.

A circular sealing disc 50 is located on the stem 46 spaced axially outwardly from the flexing disc 48. The sealing disc 50 extends radially outward from the stem 46 to circumferentially engage the chamber wall 20 to form a substantially fluid impermeable seal therebetween. Sealing disc 50 is formed sufficiently rigid so as to resist deformation, maintaining a substantially fluid impermeable seal with the chamber wall 20 on sliding the piston 16 in and out of the chamber 18.

Piston stem 46 has a central hollow passage 52 extending along the axis of the piston 16 from a closed inner end 53 located in the stem 46 between the outlet flexing disc 48 and the sealing disc 50, to an outlet 54 at the outer end 17 of the piston 16. A channel 56 passes from inlets 58 located on either side of the stem 46 between the outlet flexing disc 48 and the sealing disc 50, radially inward through the piston 16 to communicate with central passage 52. The channel 56 and central passage 52 permit fluid communication through the piston 16, past the sealing disc 50, between the inlets 58 and the outlet 54.

An outer circular engagement flange 62 is provided on the outermost end of the stem 46 which extends radially outwardly from about the outlet 54. As discussed later flange 62 is engaged by an actuating device in order to move the piston 16 in and out of the body 12.

A circular stopping disc 64 is provided on the stem 46 between the flange 62 and the sealing disc 50 extending radially outward from the stem 46. Stopping disc 64 has a radius greater than the radius of the chamber 18 such that the stopping disc 64 limits inward movement of piston 16 by abutment of the stopping disc 64 with rim 38 about outer end 22 of the body 18.

Axially extending webs 66 and circumferential ribs 67 are provided to extend radially from stem 46. These webs 66 and rib 67 engage chamber wall 20 so as to assist in maintaining the piston 16 in an axially centered and aligned position when sliding in an out of the chamber 18.

Figure 1:
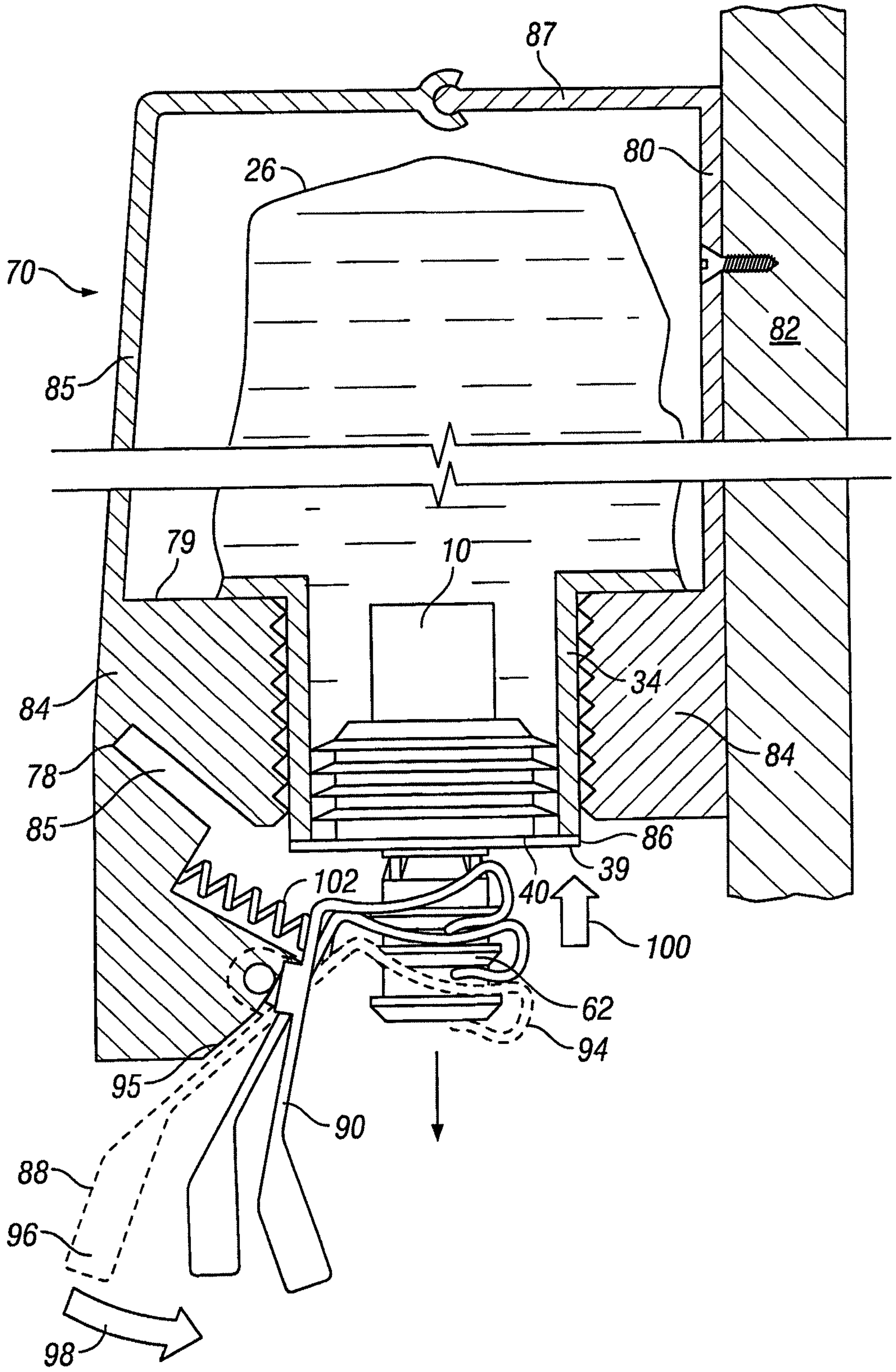
FIG. 1 is a partially cut away side view of a preferred embodiment of a liquid dispenser with the reservoir and pump assembly in accordance with a first aspect of the present invention.

Reference is now made to FIG. 1 which shows a liquid soap dispenser generally indicated 70 utilizing pump assembly 10 and reservoir 26 with pump assembly 10 inserted into neck 34 of reservoir 26. Dispenser 70 has a housing generally indicated 78 to receive and support the pump assembly 10 and reservoir 26. Housing 78 is shown with a back plate 80 for mounting the housing, for example, to a building wall 82. A bottom support plate 84 extends forwardly from the back plate to receive and support the reservoir 26 and pump assembly 10. As shown, bottom support plate 84 has a circular opening 86 therethrough. The reservoir 26 sits, supported on plate 79 with its neck 34 extending through opening 86 and secured in the opening as by friction fit, clamping and the like. A cover member 85 is hinged to an upper forward extension 87 of back plate 80, so as to permit replacement of reservoir 26 and its pump assembly 10.

Bottom plate 84 carries at a forward portion thereof an actuating lever 88 journalled for pivoting about a horizontal axis at 90. An upper end of lever 88 carries a hook 94 to engage engagement flange 62 and couple lever 88 to piston 16, such that movement of the lower handle end 96 of lever 88 from the broken line position to the solid line positions, in the direction indicated by arrow 98 slides piston inwardly in a return, pumping stroke as indicated by arrow 100. On release of lower handle end 96, spring 102 biases the upper portion of lever 88 downwardly so that the lever 88 draws piston 16 outwardly to a fully withdrawn position as seen in broken lines in FIGS. 1 and 2 in which the lever 88 is pivoted by the spring 102 clockwise to the position shown in broken lines where a stop surface 95 on the bottom plate engages the lower handle end 96 of the lever 88 and prevents further rotating clockwise. Lever 88 and its inner hook 94 are adapted to permit manually coupling and uncoupling of the hook 94 as is necessary to remove and replace reservoir 26 and pump assembly 10.

Manual forces applied to the lower handle end 96 of the lever 88 rotate the lever 88 counterclockwise against the bias of the spring 102. The counterclockwise rotation of the lever 88 is, in accordance with the present invention, to be stopped at different rotational positions corresponding to different lengths of strokes of the piston 16. The pump 10 in FIGS. 1 to 7 is illustrated as configured for either “short stroke” operation or “long stroke” operation.

As seen in FIG. 2, the pump assembly 10 is configured for “short stroke” operation and a removable stop member 81 is provided presenting a concave stop surface 83 to engage the upper end of the lever 88 and prevent further counterclockwise pivoting of the lever 88 at a short stroke fully retracted position in which the lever 88 is shown in solid lines in FIG. 2.

The stop member 81 is an elongate rigid cylindrical member with a concave end providing the stop surface 83. The stop member 81 is removably received in a friction fit in a blind bore 85 in the bottom support plate 84.

In short stroke operation by movement of the lever 88, the piston 16 is moved between the fully extended position of FIG. 3 and the short stroke fully retracted position of FIG. 4.

As seen in FIG. 1, the pump assembly is configured for "long stroke" operation when the stop member 81 shown in FIG. 2 is removed and not present. In the long stroke operation as seen in FIG. 1, counterclockwise pivoting of the lever 88 is stopped by the stopping disc 64 on the piston 16 engaging the rim 38 of the body 12 to limit inward sliding movement of the piston 16 relative the body 12 in a long stroke fully retracted as seen in FIG. 6.

Figure 6:
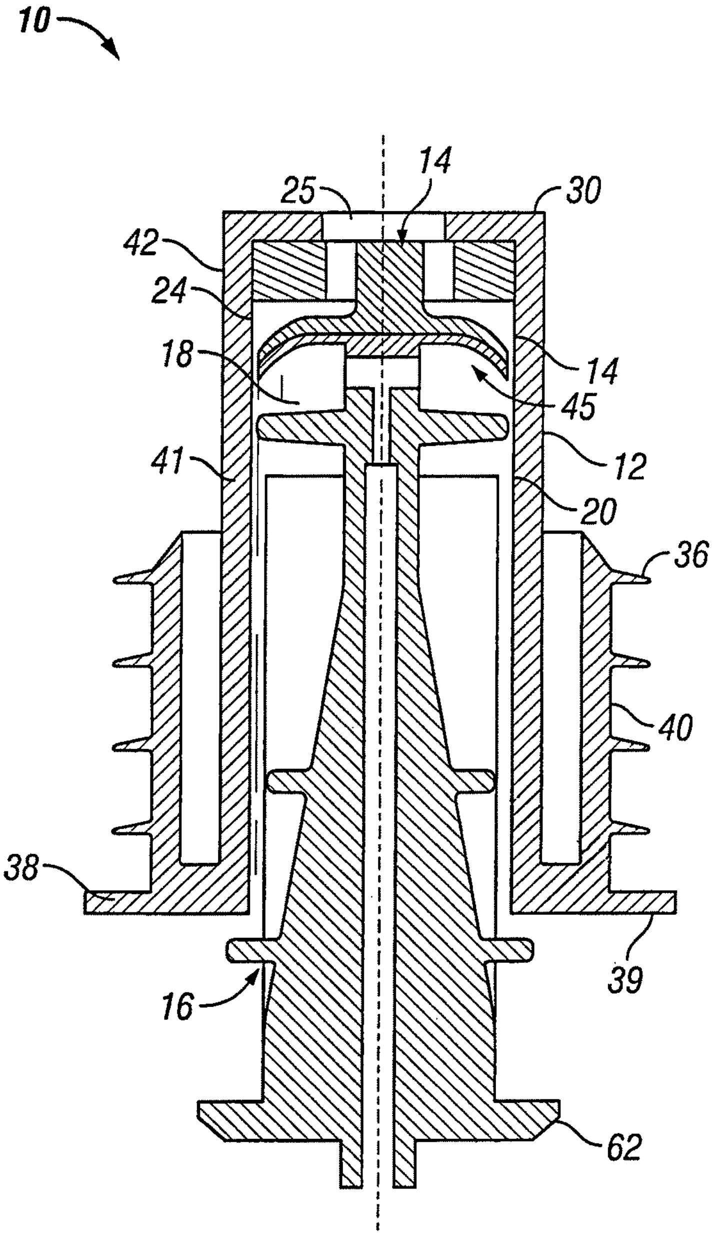
FIG. 6 is a cross-sectional side view similar to FIG. 3 but with the inlet valve in a long stroke position and the piston in a fully retracted position for a long stroke.
Figure 7:
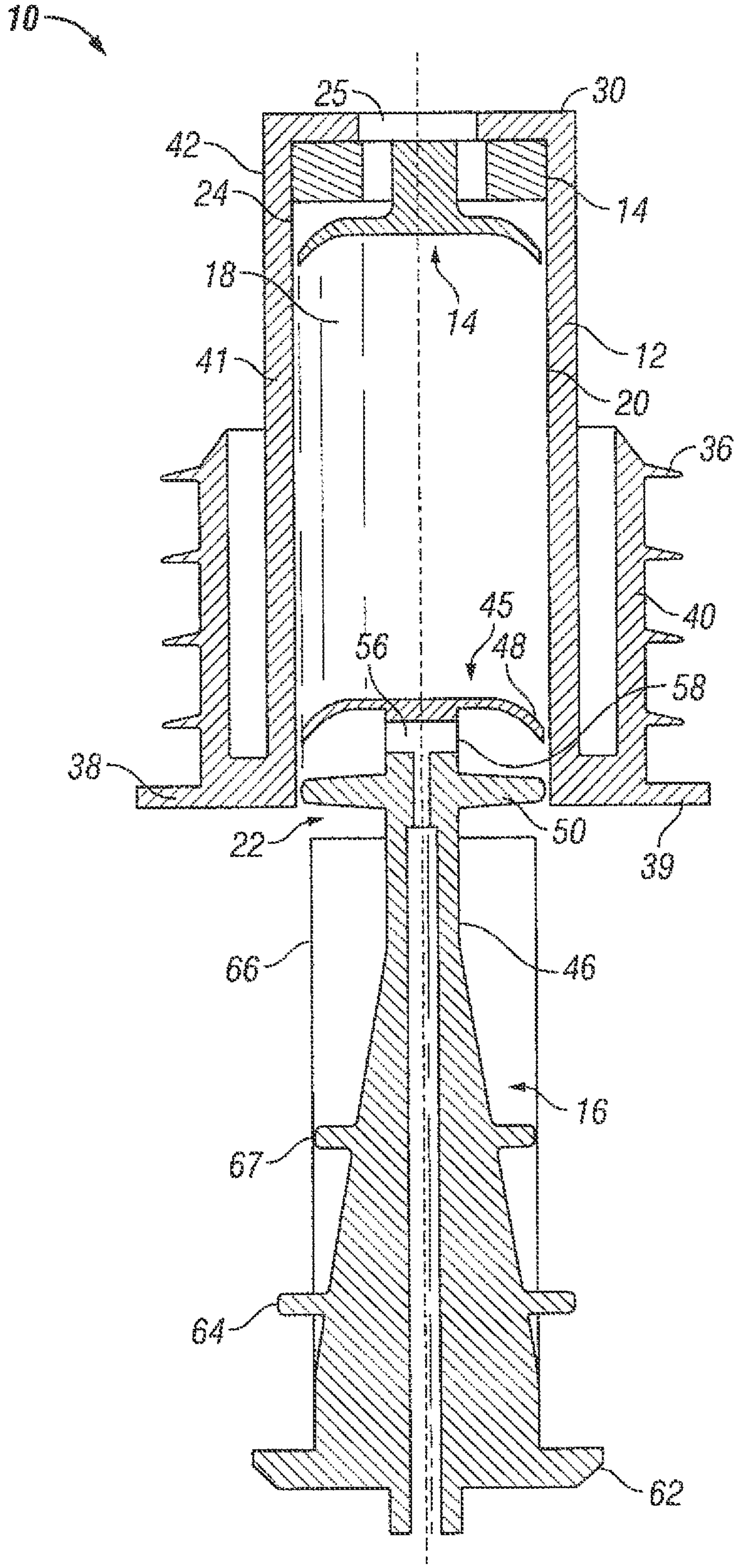
FIG. 7 is a cross-sectional view the same as to FIG. 5 with the inlet valve in a long stroke position but with the piston in the fully extended position.

In long stroke operation by movement of the lever 88, the piston 16 is moved between the fully extended position of FIG. 7 and the long stroke fully retracted position of FIG. 6.

In use of the pump assembly 10, the pump assembly 10 is provided and initially coupled to the soap dispenser 70 with the one-way valve 14 in the chamber 18 in the short stroke position as seen in FIGS. 3 and 4. If the dispenser 70 is configured in the short stroke configuration as in FIG. 2 with the stop member 81 in place, then on manual movement of the lever 88, the piston 16 will move inwardly only as far as the short stroke retracted position and short stroke operation will occur as seen in FIGS. 3 and 4 with inlet valve 14 remaining in a friction fit in the chamber 18 in the short stroke position and the piston 16 reciprocally movable between the positions in FIGS. 3 and 4.

Figure 5:
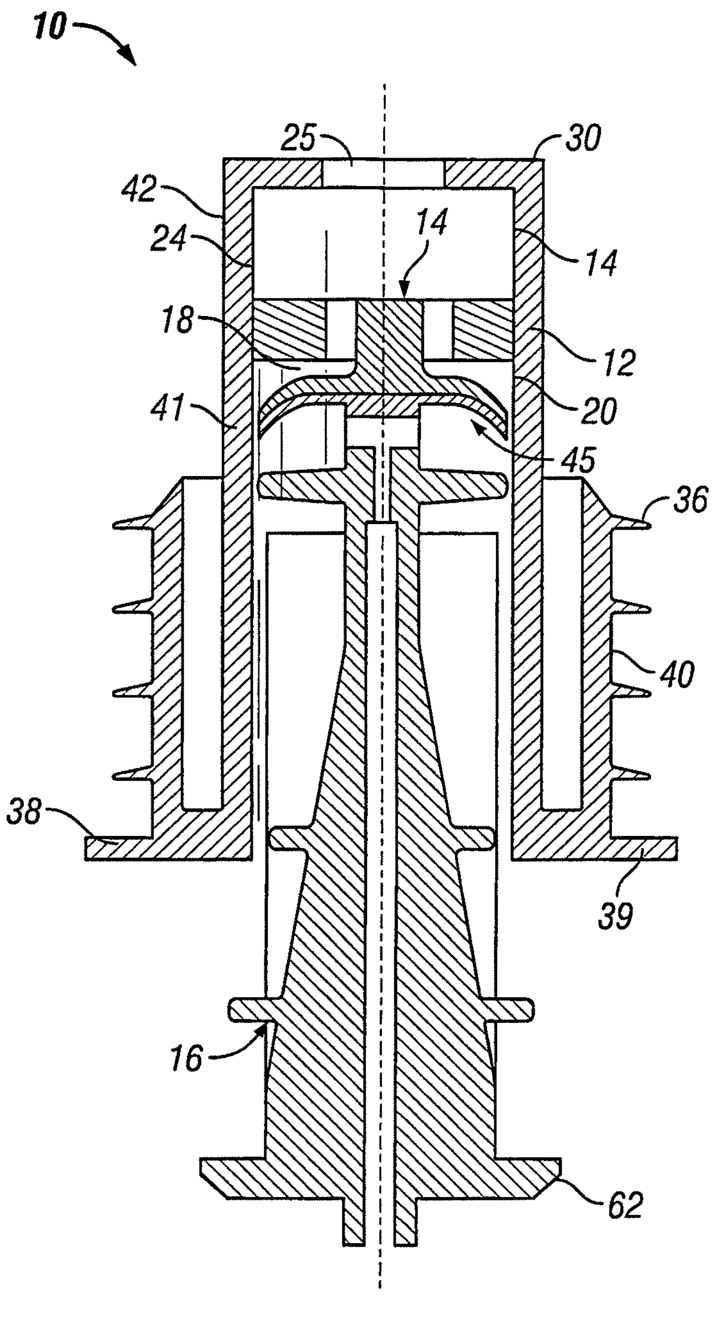
FIG. 5 is a cross-sectional side view similar to FIG. 3 but showing the piston engaging an inlet valve and moving the inlet valve inwardly from the short stroke position.

If the dispenser 70 is configured in the long stroke configuration as in FIG. 2 with the stop member not in place, then on initial manual movement of the lever 88, the piston 16 will move inwardly from the position of FIG. 3, to the position in FIG. 4 in which it engages the inlet valve in the short stroke position and, with further inward movement of the piston 16, will move the inlet valve 14 axially inwardly past the short stroke position as seen in FIG. 5 to the long stroke position of the inlet valve 14 as seen in FIG. 6 in which the inlet valve 14 abuts against the inner shoulder 30 at the innermost end of the chamber 18.

Subsequently, long stroke operation will occur as seen in FIGS. 6 and 7 with the inlet valve 14 remaining in a friction fit in the chamber 18 in the long stroke position and the piston 16 reciprocally movable between the positions of FIGS. 6 and 7.

Operation of the pump assembly 10 in the short stroke configuration is now described with particular reference to FIGS. 3 and 4 in which the inlet valve 14 remains in a short stroke position shown in FIGS. 3 and 4 spaced outwardly from the inner end 24 of the chamber 18. FIG. 3 shows the pump assembly with piston 16 in a fully retracted position. FIG. 4 shows the pump assembly with piston 16 in a fully withdrawn position for short stroke operation and in which the outlet flexing disc 48 comes into close proximity or into engagement with the inner flexing disc 44 to discharge any fluid, liquid or air therebetween. Pumping results in a cycle of operation by moving the piston 16 in a withdrawal stroke from the extended position of FIG. 3 to the retracted position of FIG. 4 and in a retraction stroke from the retracted position of FIG. 3 to the extended position of FIG. 4.

During the withdrawal stroke, the withdrawal of the piston causes one-way inlet valve 14 to open and the one-way outlet valve to close with fluid to flow into chamber 18 past the inlet valve 14. In the withdrawal stroke, the outlet valve 45 remains closed since the outlet flexing disc 48 remains undeflected, preventing flow inwardly therepast, and assisting in creating suction forces in chamber 18 between the inlet valve 14 and the outlet valve 45 to deflect the inlet disc 44 and draw fluid into chamber 18 past inlet flexing disc 44 of the inlet valve.

During the return stroke, the return of piston 16 pressurizes fluid in chamber 18 between the outlet valve and one-way valve 14. This pressure urges the inlet flexing disc 44 to a closed position to prevent fluid flow inwardly therepast. As a result of this pressure, outlet flexing disc 48 deflects its periphery to come out of sealing engagement with chamber walls 20 and permit fluid to flow past the outward flexing disc 48 of the outlet valve 45 and out of chamber 18 via passage 52 and channel 56 and passage 52.

The outlet flexing disc 48, on one hand, substantially prevents flow therepast in the withdrawal stroke and, on the other hand, deforms to permit flow therepast in the return stroke. The outlet flexing disc 48 shown facilitates this by being formed as a thin resilient disc, in effect, having an elastically deformable edge portion near chamber wall 20.

When not deformed, flexing disc 48 abuts chamber wall 20 to form a substantially fluid impermeable seal. When deformed, as by its edge portion being bent away from wall 20, fluid may flow past the disc. Disc 48 is deformed when the pressure differential across it, that is, the difference between the pressure on one side and pressure on the other side, is greater than a maximum pressure differential which the disc can withstand without deflecting. When the pressure differential is greater than this maximum pressure differential, the disc deforms and fluid flows past. When the pressure differential reduces to less than this maximum pressure differential, the disc returns to its original shape substantially forming a seal with wall 20.

Each of the inlet flexing disc 44 and the outlet flexing disc 48 is designed to resist deformation in one direction compared to the other so as to assist in achieving the desired operation of the one-way inlet valve 14 and the one-way outlet valve 45, respectively.

During short stroke operation of the pump assembly 10, the inlet valve 164 remains in the short stroke position as seen in FIGS. 3 and 4 due to the frictional engagement between the inlet valve 14 and the chamber 18.

This frictional engagement needs to be sufficient to prevent axial movement of the annular ring 42 of the inlet valve 14 relative the chamber 18 under forces applied to the inlet valve 14 in pumping operation of the pump assembly. This frictional engagement must be sufficient to prevent movement of the annular ring 42 under pressures developed in a return stroke when the piston 16 pressurizes fluid in the chamber 18, and thus must be sufficient to prevent inward movement of the annular ring 42 under pressures greater than pressures which deflect the out flexing disc 48 of the outlet valve 45 to permit fluid flow outwardly therepast. This frictional engagement must be sufficient to prevent outward movement of the annular ring 42 under suction or vacuum conditions developed in a withdrawal stroke when the piston 16 develops suction forces in the chamber between the inlet valve 14 and the outlet valve 45, and thus must be sufficient to prevent outward movement of the annular ring 42 under pressure differentials across the inlet valve 14 which are greater than pressure differentials which deflect the inner flexing disc 44 of the inlet valve 14 to permit fluid to pass outwardly.

As will be appreciated by a person skilled in the art, factors such as the viscosity of the fluid; temperature; the resistance to flow through various openings and passages notably openings 43, the passage 52, channel 56 and inlets 58; the speed of movement of the piston 16; and the strength of the spring 112 will affect pressures which the frictional engagement of the annular ring 42 in the chamber 18 must resist.

Operation of the pump assembly in the long stroke configuration is the same as in the short stroke configuration with the exception that as shown in FIGS. 6 and 7, the inlet valve 14 is in the long stroke position. During long stroke operation of the pump assembly 10, the inlet valve 14 remains in the long stroke position as seen in FIGS. 6 and 7 due to the frictional engagement between the inlet valve 14 and the chamber 18. This frictional engagement must be sufficient to prevent outward movement of the annular ring 42 under suction or vacuum conditions developed in a withdrawal stroke when the piston 16 develops suction forces in the chamber between the inlet valve 14 and the outlet valve 45. The inward movement of the inlet valve 14 is prevented not only by the frictional engagement of the inlet valve 14 with the chamber 18 but also by the inlet valve 14 engaging the inner shoulder 30 of the inner end 24 of the chamber 18.

In use of the dispenser 70, once exhausted, the empty reservoir 26 together with its attached pump 10 are removed and a new reservoir 26 and attached pump 10 are inserted into the housing. Preferably, the removed reservoir 26 and attached pump 10 is made entirely of recyclable plastic material which may easily be recycled without the need for disassembly prior to cutting and shredding.

While the preferred embodiments show a plastic cylindrical piston-chamber 12 and piston 16, piston-chambers and pistons of other symmetrical and non-symmetrical shapes and materials may also be used.

Although a piston-chamber 12 having a stop flange 39 and outer cylindrical portion 40 having gripping flanges 36 is preferred, the gripping flanges 36 or other gripping means could be provided elsewhere on the piston-chamber 12.

Reference is now made to FIGS. 8 to 21 which show other embodiments of a pump assembly in accordance with the invention. In all the figures, similar reference numerals are used to indicate similar elements to those in the first embodiment of FIG. 3.

Reference is made to FIGS. 8 to 11 showing a second embodiment of a pump assembly 10 in accordance with the present invention. The pump assembly shown in FIG. 8 has similarities to the pump assembly described in the applicant's U.S. Patent Publication US 2011/0014076, published Jan. 20, 2011, which is incorporated herein by reference. The pump assembly of FIGS. 8 to 11 is a piston pump assembly 10 including a piston 16 reciprocally slidable within a body 12. The body 12 provides a fluid chamber 18 with a one-way inlet valve 14 coaxially slidable within the fluid chamber 18. The fluid chamber 18 and the body 12 provide an outer chamber 118. The piston 16 provides a fluid piston head 200 to coaxially slide within the fluid chamber 18 and, in addition coaxially about the liquid piston head, and a guide head 202 to engage an outer wall 120 of the outer chamber 118. In the outer chamber, a return spring member 208 is provided to bias the piston 16 outwardly relative the body. Stop surfaces 210 on the guide head 202 engage stop surfaces on the outer wall 120 of the outer chamber 118 to limit outward sliding of the piston. With movement of the piston 16 inwardly, fluid is compressed within the fluid chamber 18. The piston head 202 has a functionality substantially identical to the piston described in the first embodiment of FIGS. 3 to 7 with the piston head 202 carrying the outlet flexing disc 48 and the sealing disc 50.

However, the piston 16 is shown as comprising two tubular portions, an inner portion 224 and an outer portion 226. The inner portion 224 carries the outlet valve 45 and the outer portion 226 carries the sealing disc 50. The inner portion 224 has a blind hollow tubular stem 228 closed at an inner end and open at an outer end. The tubular stem 228 is received within a central bore 229 of the tubular outer portion. While the tubular portions 224 and 226 may be fixed together against axial movement, as shown in FIGS. 8 to 12, the inner portion 224 is coaxially slidable relative the outer portion 226 a limited axial extent between opposing shoulders 229 and 230 to provide a drawback function as described in earlier mentioned U.S. Patent Publication US 2011/014076.

Figure 8:
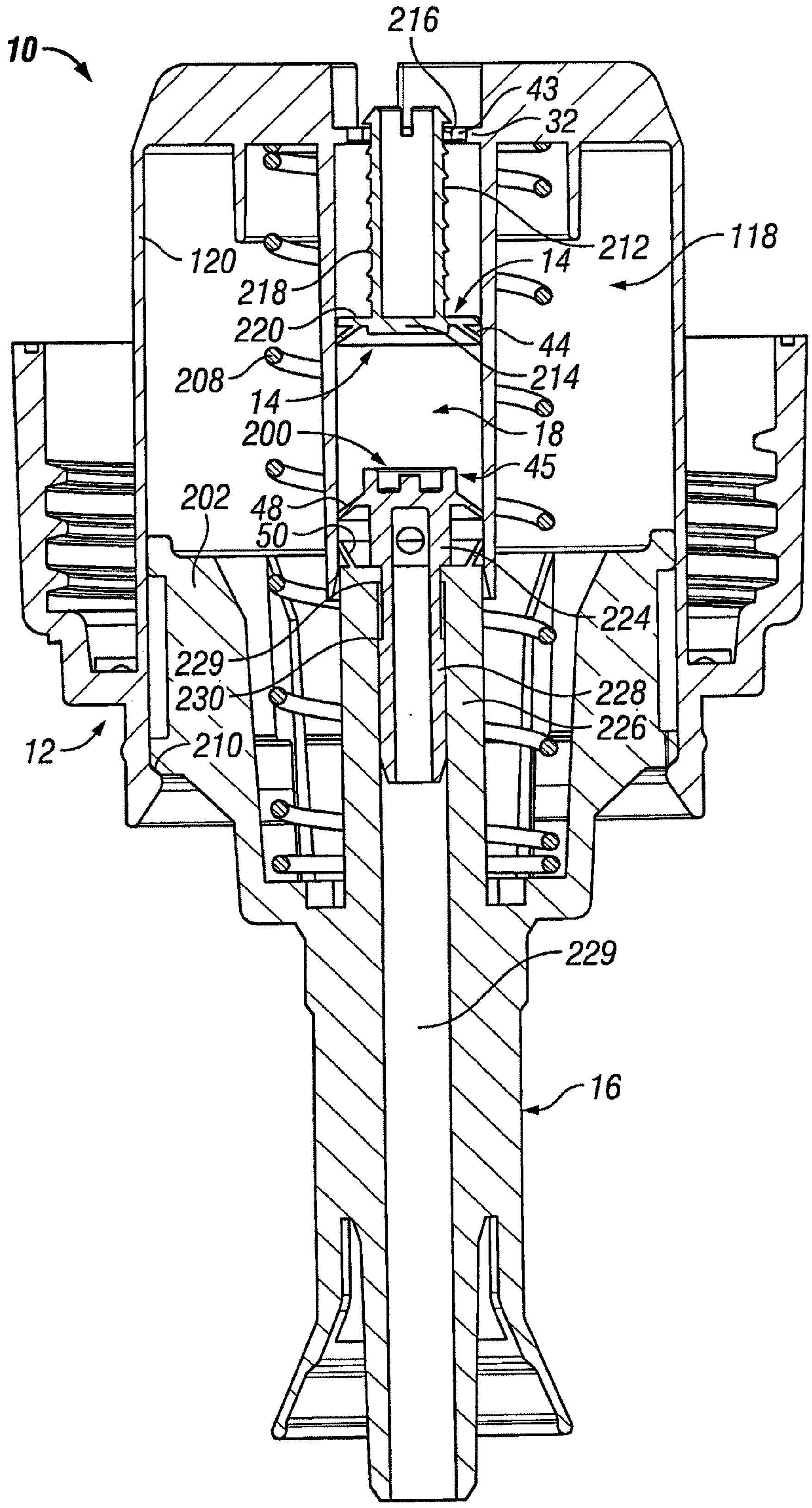
FIG. 8 is a cross-sectional side view of a second embodiment of a pump assembly in accordance with the present invention with the inlet valve in a short stroke position and the piston in a fully withdrawn position.

Similarly to that described with the first embodiment of FIGS. 3 to 7, in the second embodiment in FIGS. 8 to 11, the one-way inlet valve 14 carries the inlet flexing disc 44. As seen in FIG. 8, the one-way inlet valve 14 has a cylindrical stem member or tube 212 which is closed by a radially outwardly extending end disc 214 which carries the inlet flexing disc 44. The body 12 at the inner end 24 of the fluid chamber 18 provides a radially inwardly extending shoulder 32 with a circular central stem guide opening 216 therethrough within which the tube 212 of the inlet valve 14 is axially slidable. Axially outwardly from the central opening 216 through the shoulder 32, the shoulder 32 is also provided with openings 43 for fluid flow through the shoulder 32. The tube 212 carries on its outer cylindrical surface a series of axially spaced annular rings 218. The rings are spaced apart a distance approximately equal to the axial thickness of the shoulder 32. Each of the rings 218 provides an axial stop member which is to engage the axial inner and outer surfaces of the shoulder 32 and resist axial sliding of the tube 212 relative to the shoulder 32 unless forces are applied to the inlet valve 14 sufficiently great to overcome the frictional engagement between the rings 218 and the shoulder 32. Thus, the series of rings 218 about the tube 212 of the inlet valve 14 provide a ratchet type friction fit resistance structure which permits the inlet valve 14 to frictionally be secured in the chamber 18 at different axial positions, however, free to be moved inwardly relative to the chamber when forces are applied to the inlet valve 14 greater than the engagement forces between the rings 218 and the shoulder 32.

Figure 9:
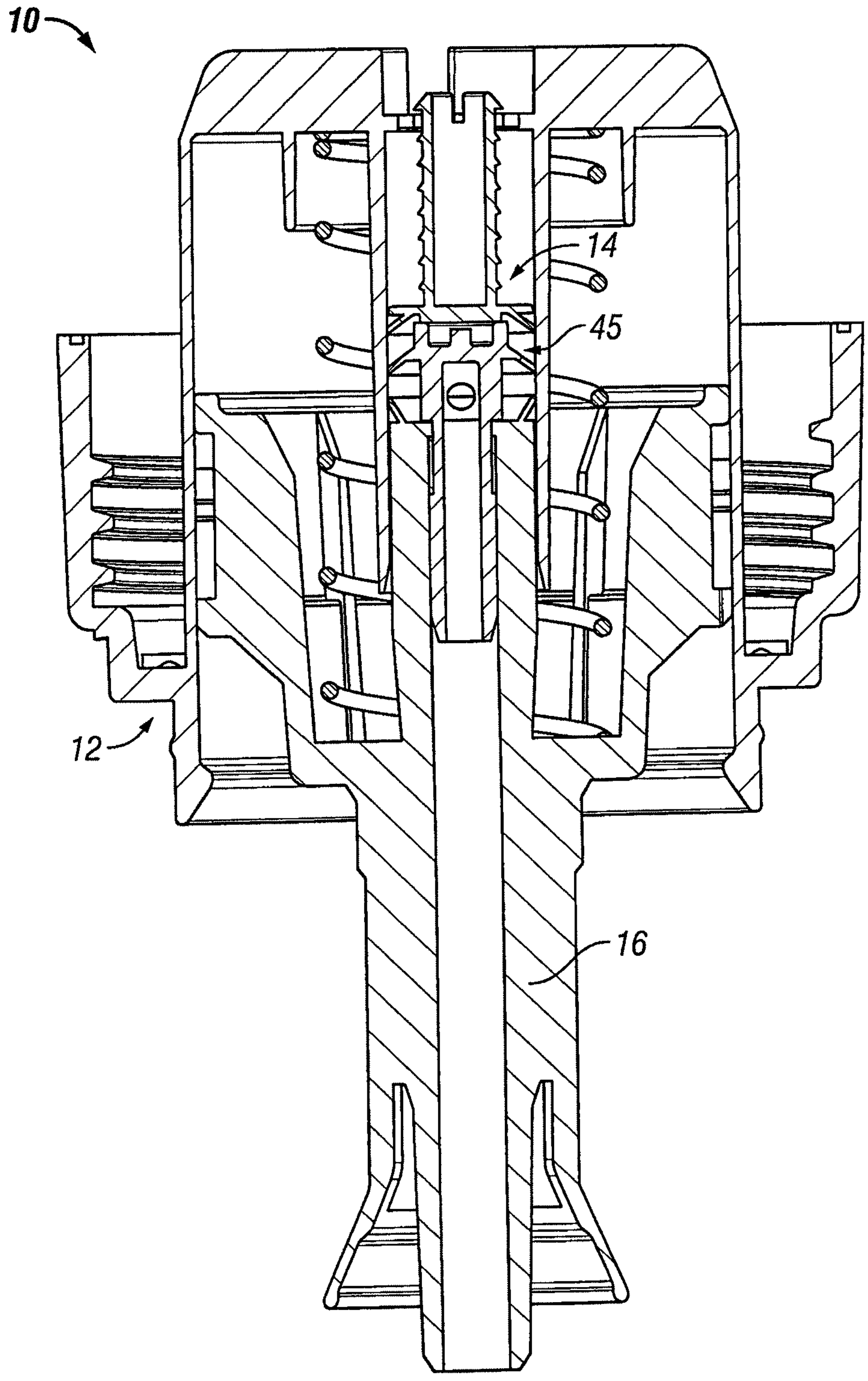
FIG. 9 is a cross-sectional side view the same as FIG. 8 with the inlet valve in the short stroke position but with the piston in a fully retracted position for a short stroke.
Figure 10:
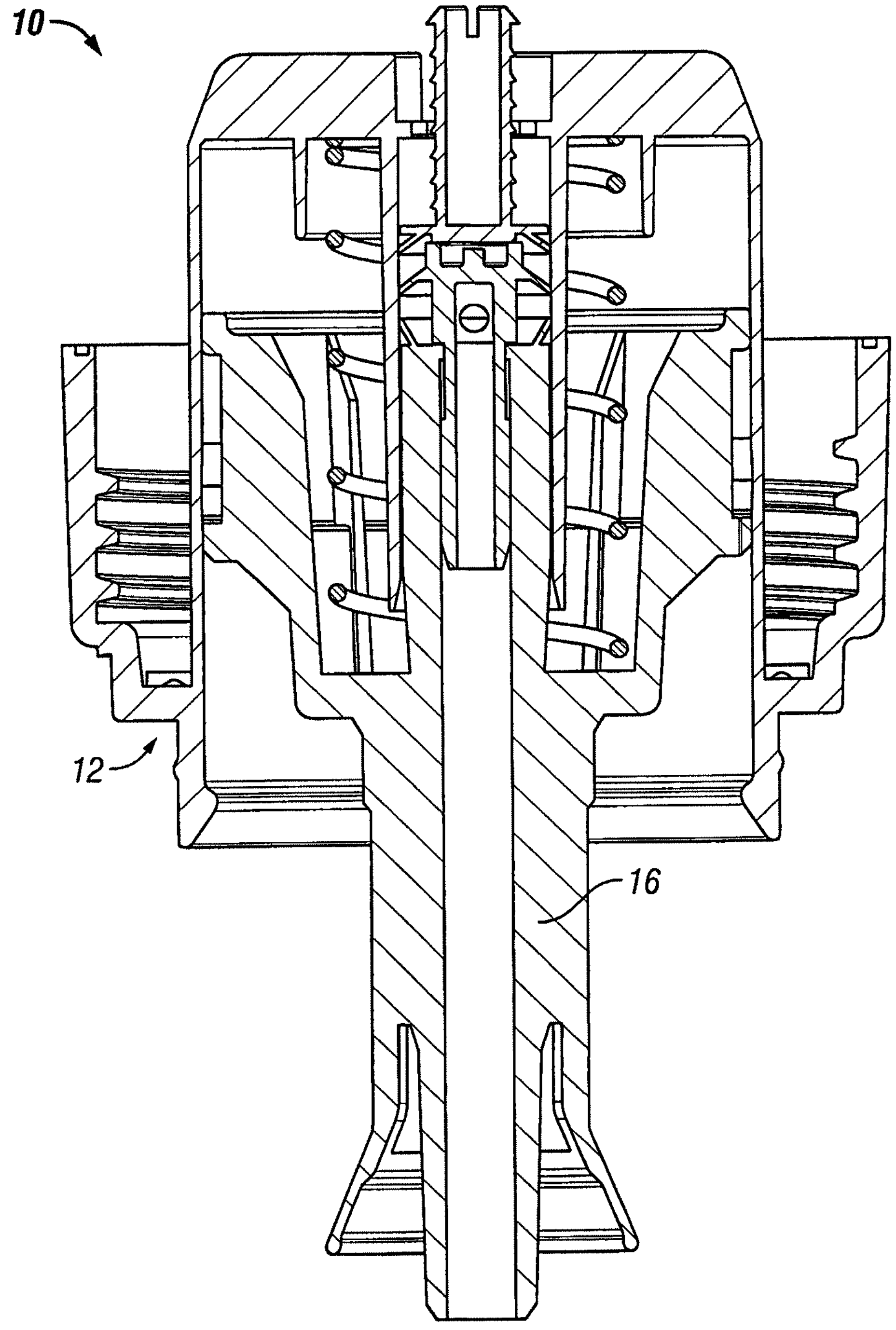
FIG. 10 is a cross-sectional side view similar to FIG. 8 but showing the piston engaging an inlet valve and moving the inlet valve inwardly from the short stroke position.
Figure 11:
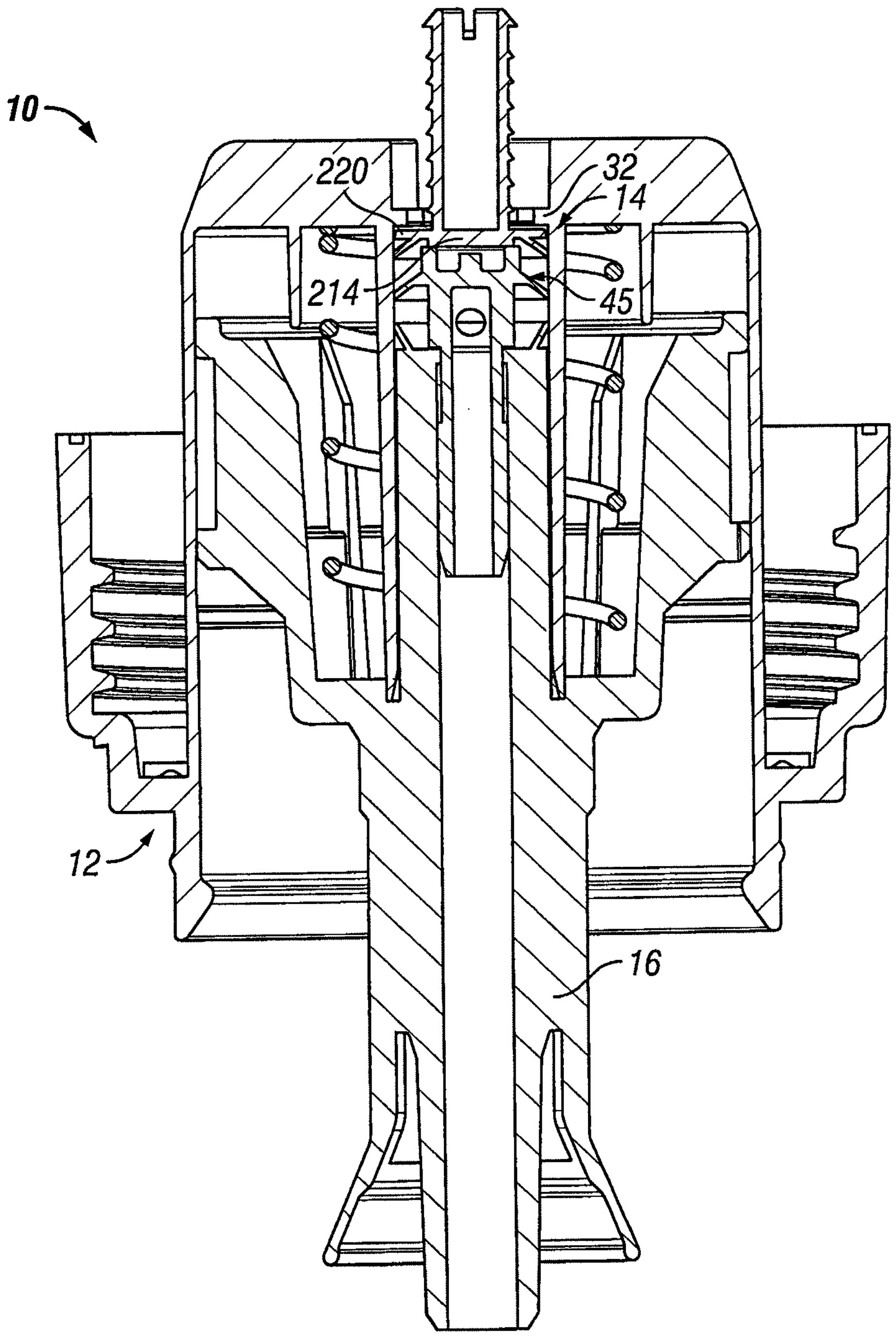
FIG. 11 is a cross-sectional side view similar to FIG. 3 but with the inlet valve in a long stroke position and the piston in a fully retracted position for a long stroke.

Operation of the second embodiment is similar to the operation of the first embodiment. The piston assembly 10 is preferably provided with the inlet valve 14 in a short stroke position as shown in FIGS. 8 and 9. If the piston 16 is limited to inward movement to a short stroke position as shown in FIG. 9, then short stroke operation of the pump can occur by reciprocal sliding of the piston inwardly and outwardly between the positions of FIG. 8 and FIG. 9. If, however, the piston 16 is permitted to move further inwardly relative to the body 12 then the piston 16 will engage the inlet valve 14 and move the inlet valve 14 inwardly to a position inwardly from the short stroke position. The inlet valve 14 will stay at the position to which the piston 16 has moved the inlet valve 14 inwardly in the chamber 18 from the short stroke position. This new inward position of the inlet valve 14 could be any position between adjacent rings 218 on the tube 212 of the inlet valve 14 inwardly from the short stroke position. FIG. 10 illustrates the piston 16 moving the inlet valve 14 inwardly past the short stroke position. FIG. 11 illustrates the piston having moved the inlet valve 14 to a long stroke position in which the inlet valve is moved fully inwardly such that its end disc 214 engages the shoulder 32 of the fluid chamber 18 in what is referred to as a long stroke position.

In the embodiment of FIGS. 8 to 11, the end disc 214 inwardly of the inlet flexing disc serves a purpose of coaxially locating the inlet valve 14 within the chamber 18 and preferably has openings 220 axially therethrough to not impede passage of fluid therepast as, for example, as disclosed in U.S. Patent Publication US 2010/0140879 to Ophardt et al, published Jun. 10, 2010, the disclosure of which is incorporated herein by reference.

Figure 12:
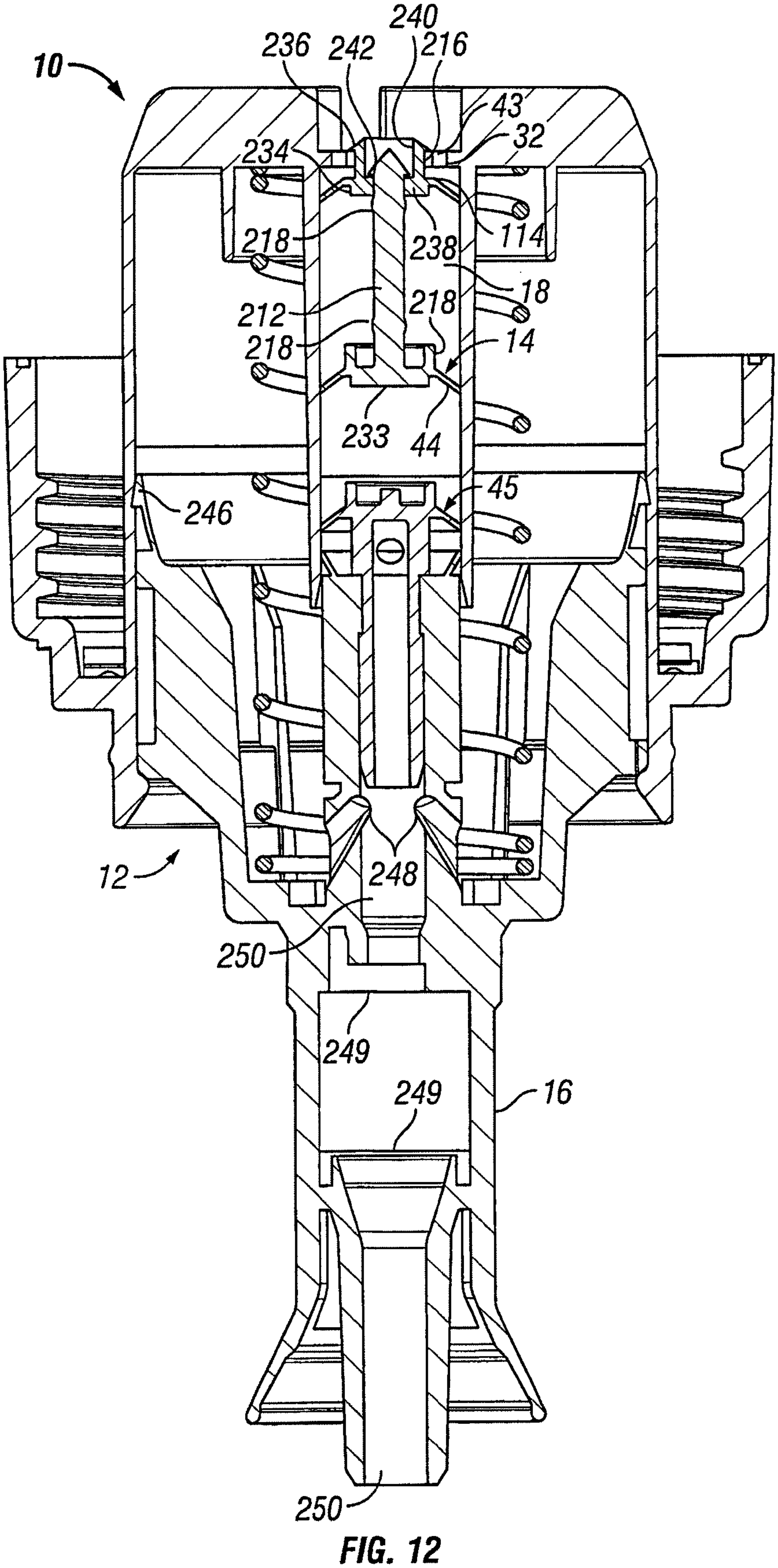
FIG. 12 is a cross-sectional side view of a third embodiment of a pump assembly in accordance with the present invention with the inlet valve in a short stroke position and the piston in a fully withdrawn position.
Figure 13:
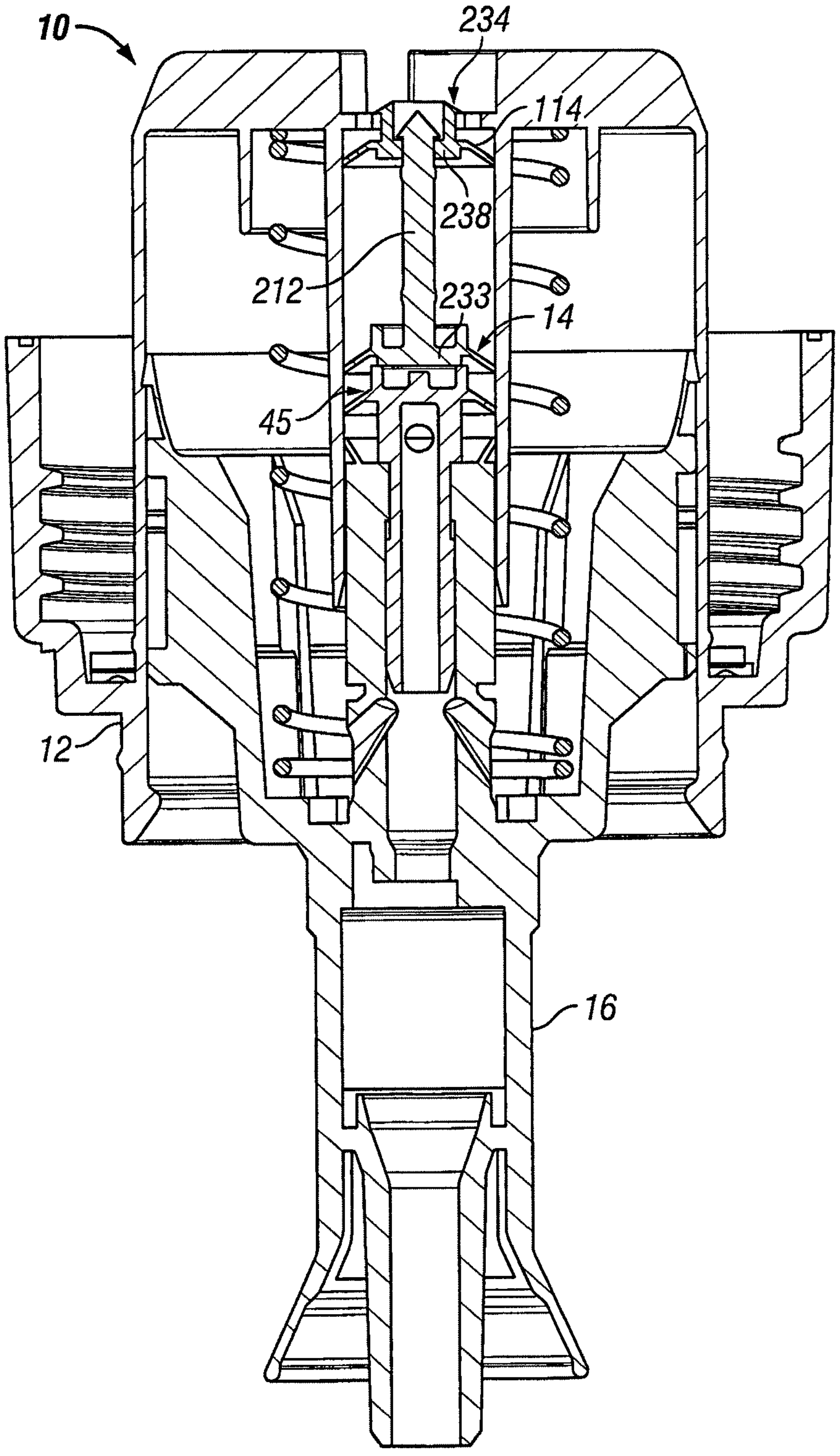
FIG. 13 is a cross-sectional side view the same as FIG. 12 with the inlet valve in the short stroke position but with the piston in a fully retracted position for a short stroke.
Figure 14:
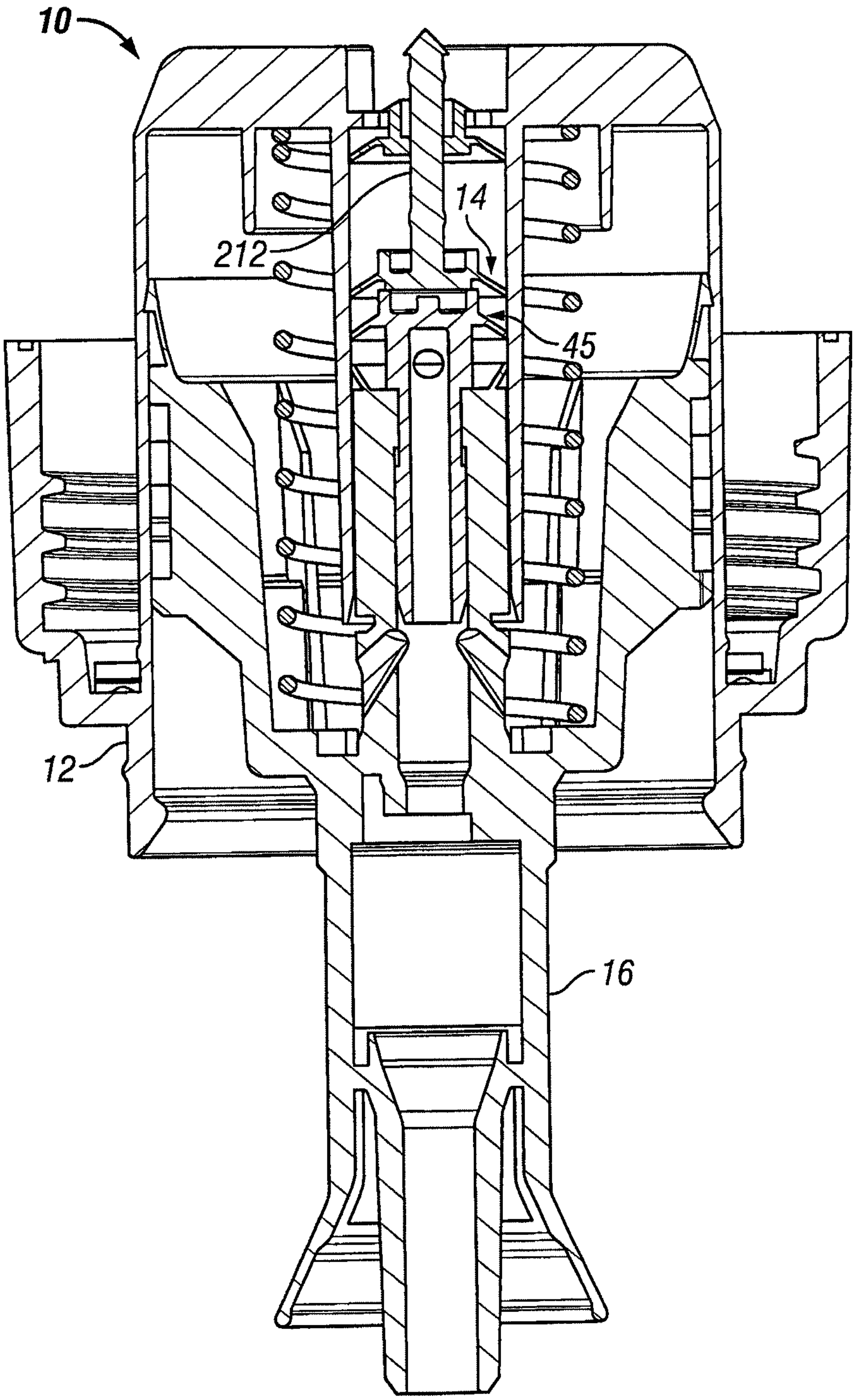
FIG. 14 is a cross-sectional side view similar to FIG. 12 but showing the piston engaging an inlet valve and moving the inlet valve inwardly from the short stroke position.
Figure 15:
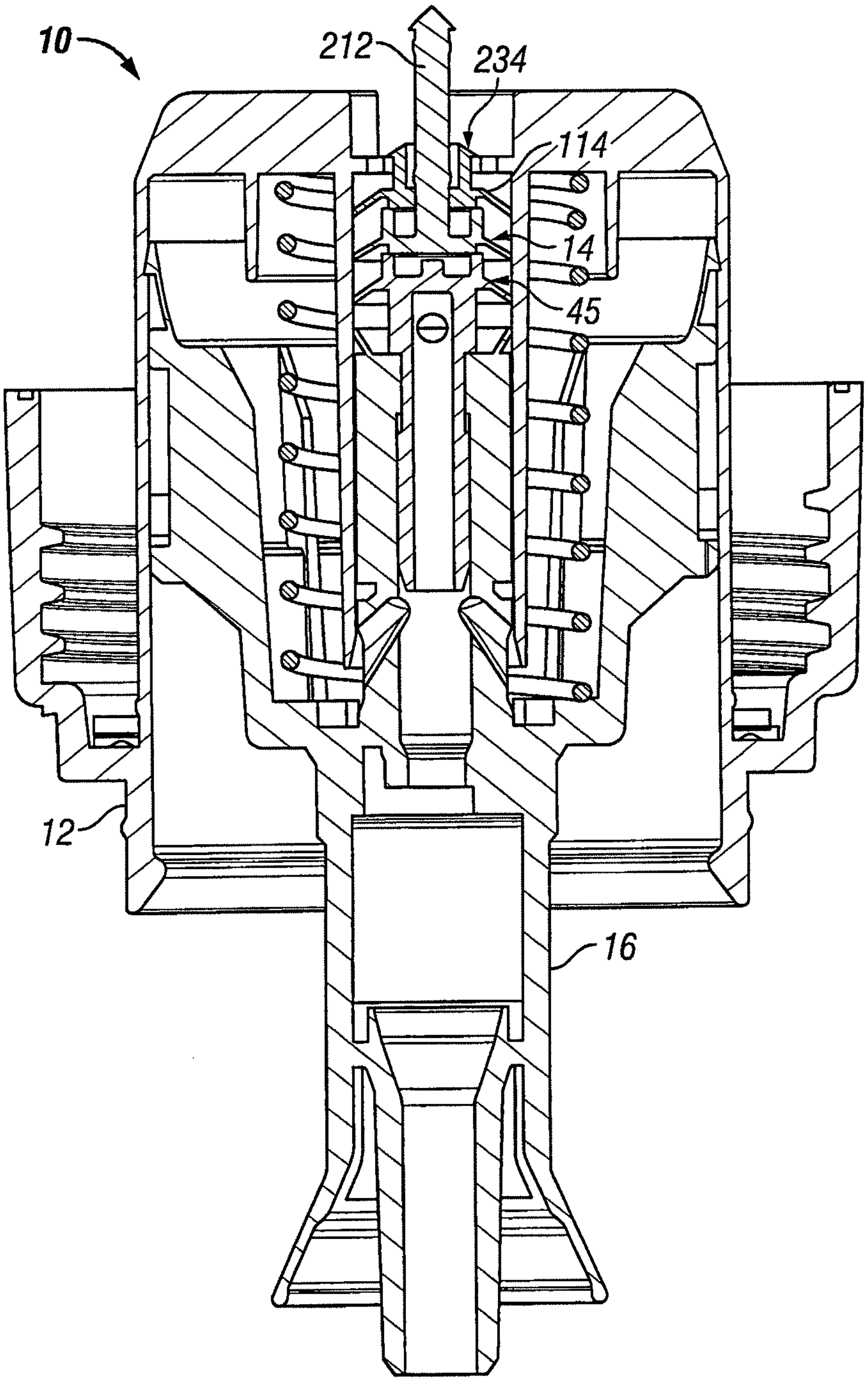
FIG. 15 is a cross-sectional side view similar to FIG. 12 but with the inlet valve in a long stroke position and the piston in a fully retracted position for a long stroke.

Reference is made to FIGS. 12 to 15 which illustrate a third embodiment of a pump assembly in accordance with the present invention. The pump assembly 10 of FIGS. 12 and 13 is identical to the pump assembly of the second embodiment in FIGS. 8 to 11 with the exceptions of the modification of the shoulder 32 at the inner end 24 of the fluid chamber 18, the modification of the one-way inlet valve and the modification of the pump to also pump air. As seen in FIG. 12, the one-way inlet valve 14 has an elongate cylindrical stem 212 which at the outer end carries on an end disc 233 the inlet sealing disc 44. The shoulder 32 at the inner end of the chamber 18 has a central opening 216 therethrough with openings 43 axially outwardly thereof for passage of fluid. A resilient button member 234 is received in a snap-fit in the central opening 216 with the periphery of the central opening 216 received in a radially outwardly directed slot in the button member 234 between an enlarged inner end 236 of the button member 234 and an outer annular ring 238 on the button member. From the outer annular ring 238 of the button member 234, a flexing disc 114 extends outwardly. The button member 234 provides an innermost one-way valve which in a manner similar to the inlet flexing disc 44 of the inlet valve 14 permits fluid flow outwardly therepast but prevents fluid flow inwardly. The button member 234 has a central opening 240 through its annular ring 238 sized to frictionally engage the outer surface of the cylindrical stem 212 of the inlet valve 14. On the outer surface of the cylindrical stem 212, there are provided two radially outwardly extending annular rings 218. Near an inner end of the stem 212, there is provided an annular stop ring 242 with an axially outwardly directed stop shoulder so as to prevent axial sliding of the stem 212 at the short stroke position shown in FIG. 12. In a short stroke position as shown in FIG. 12, the stem 212 is frictionally engaged to the annular ring 238 of the button member 234 with the annular ring 238 engaged between the stop ring 242 and a first annular ring 218. This position corresponds to the short stroke position shown in FIGS. 12 and 13. As seen in FIG. 14, if the piston 16 is moved inwardly past the short stroke position, inward movement of the piston 16 moves the inlet valve 14 inwardly to a short stroke position in which the stem 212 is frictionally engaged to the button member 234 with the annular ring 242 engaged between an outer annular ring 218 on the stem 212 and an axially outwardly directed surface 244 of the end disc 233 at the outer end of the inlet valve 14. Thus, in the second embodiment as shown in FIGS. 12 and 16, the one-way inlet valve 14 is adapted to be frictionally engaged in the chamber 18 either in a short stroke position as shown in FIGS. 12 and 13 or in a long stroke position as shown in FIG. 15.

In the third embodiment of FIGS. 12 to 16, the provision of the flexing disc 114 on the button member 234 is unnecessary, however, can advantageously provide an improved seal against inadvertent fluid flow outwardly from a reservoir.

FIGS. 12 to 15 show a modification over FIGS. 8 to 11 so as to provide an air seal 246 on the guide head such that the outer chamber 118 serves as an air chamber to discharge air out air passages 248 into a central passageway 250 where the air and liquid from the chamber 18 are passed through screens 249 to generate foam to be discharged out the outlet 250.

Figure 16:
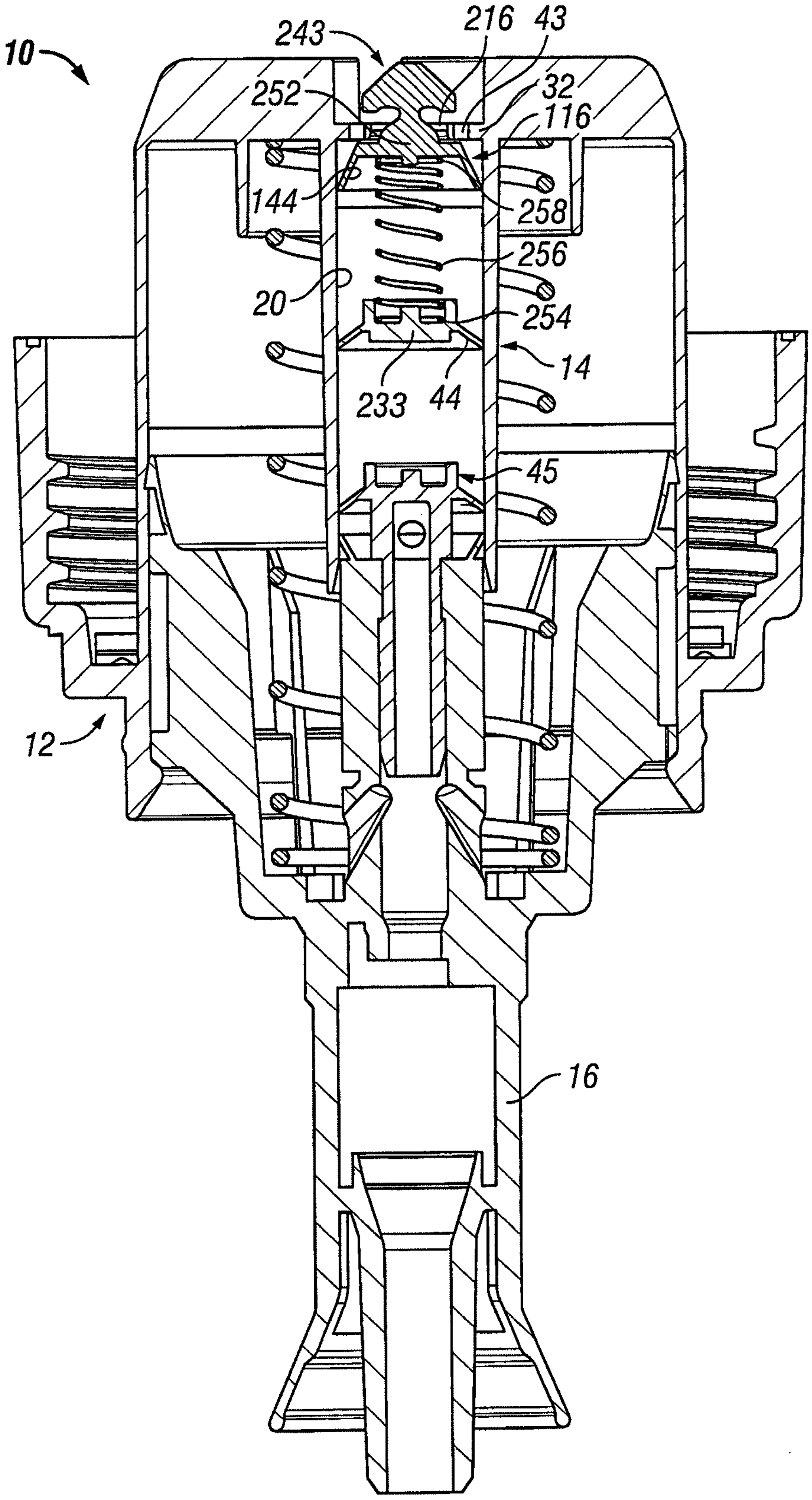
FIG. 16 is a cross-sectional side view of a fourth embodiment of a pump assembly in accordance with the present invention with the inlet valve in a short stroke position and the piston in a fully withdrawn position.

Reference is made to FIGS. 16 to 19 which show a fourth embodiment of a pump assembly 10 in accordance with the present invention. The fourth embodiment of FIGS. 16 to 19 is identical to the third embodiment of FIGS. 12 to 15 but for the modification of the one-way valve 14. As seen in FIG. 16, in a similar manner to that illustrated in FIG. 12, the shoulder 32 at the inner end 24 of the fluid chamber 18 has a central opening 216 therethrough and openings 43 spaced outwardly therefrom to permit fluid flow therethrough. A resilient button member 234 is securely engaged in the central opening 216 of the shoulder 32 against axial movement. The button member 234 carries an outer disc 252 from which an inner flexing disc 144 depends with the inner flexing disc 144 extending outwardly to engage the chamber wall 20 and provide a one-way inner valve 116 permitting flow outwardly therepast but preventing flow inwardly.

Figure 17:
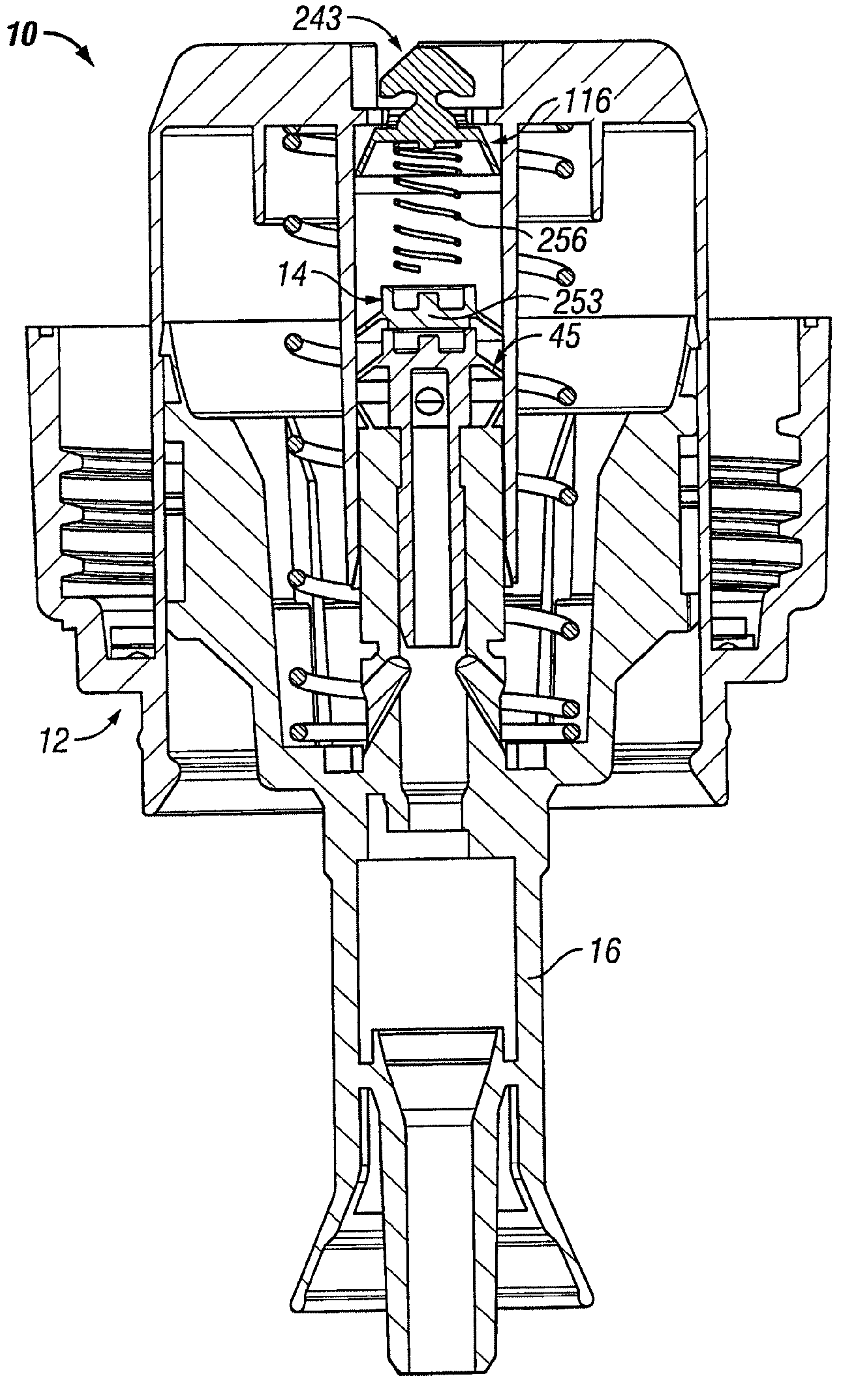
FIG. 17 is a cross-sectional side view the same as FIG. 16 with the inlet valve in the short stroke position but with the piston in a fully retracted position for a short stroke.
Figure 18:
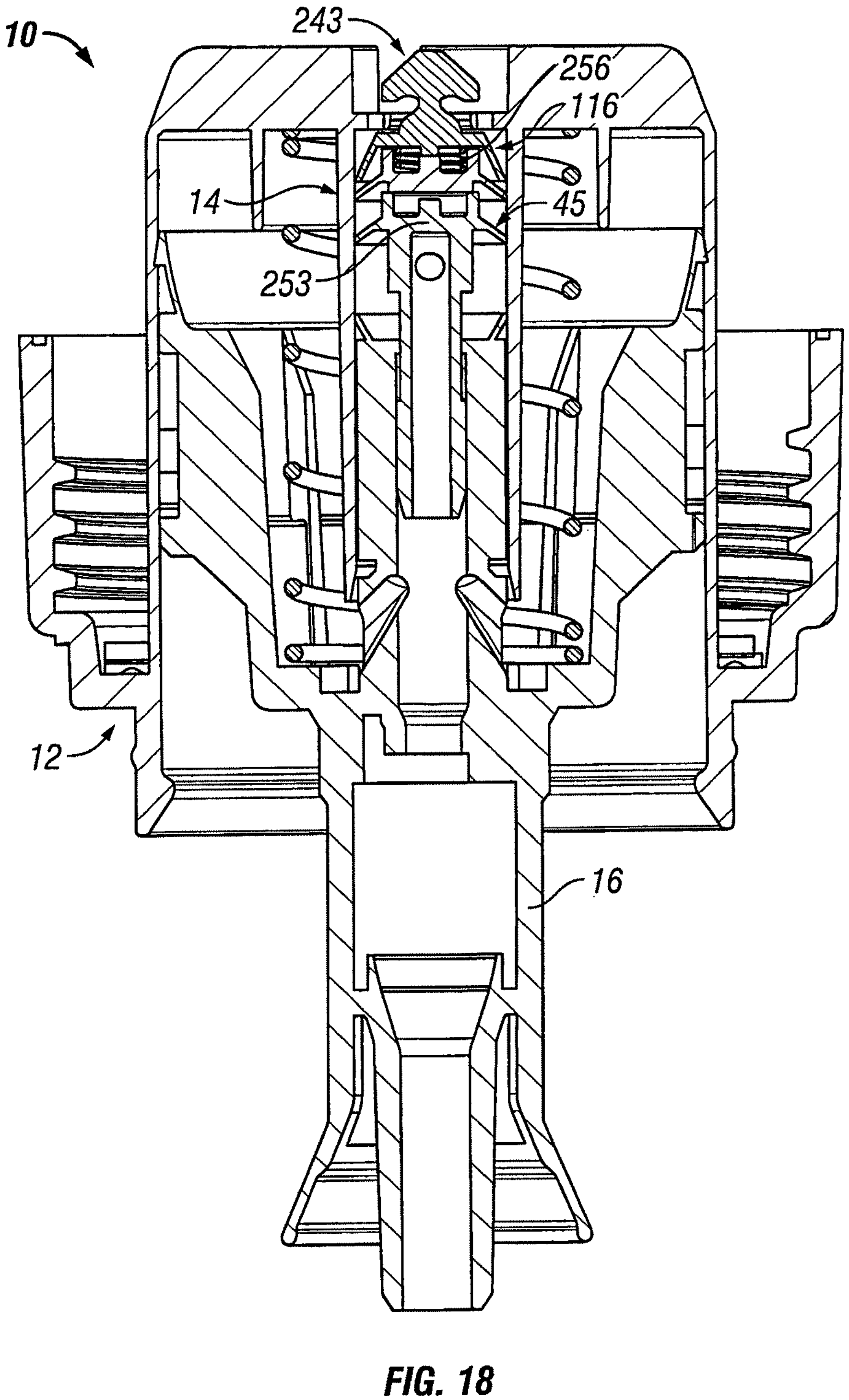
FIG. 18 is a cross-sectional side view similar to FIG. 16 but with the inlet valve in a long stroke position and the piston in a fully retracted position for a long stroke.

The one-way inlet valve 14 comprises an annular end disc 233 from which the inlet flexing disc 44 extends radially outwardly. The end disc 233 of the inlet valve 14 is carried on the outer end 254 of a helical coil spring 256 with the inner end 258 of the coil spring 256 being fixedly secured to the outer disc 252 of the button member 234. The spring member 256 is sufficiently resilient so as to maintain the inlet valve 14 at the short stroke position as shown in FIGS. 16 and 17 under normal pressures developed within the chamber 18 during movement of the piston 16 in short stroke operation between the extended position shown in FIG. 16 and the short stroke fully retracted position shown in FIG. 17. However, in the event the piston 16 is in a stroke of operation moved inwardly in the chamber 18 past the short stroke position of the inlet valve 14, then the piston 16 will engage the end disc 233 of the inlet valve 14 and move the inlet valve 14 axially inwardly into the chamber 18 by compressing the spring member 256 as, for example, seen in FIG. 18. During a long stroke operation, or any operation in which the stroke of the piston 16 extends farther inward than the short stroke position of the piston 16, seen in FIG. 17, with movement of the piston 16 past the short stroke position of the inlet valve 14, the piston 16 will compress the spring member 256 and move the inlet valve 14 inwardly. On subsequent outward movement of the piston 16, the outlet valve 14 will return to the short stroke position of FIG. 16 under the bias of the spring member 256, however, due to the inclusion of the one-way inner valve 16, the button member in any such long stroke movement of the piston 16, the volume of fluid displaced will be represented by the volume of fluid dispensed in short stroke operation plus an increased volume of fluid represented by the distance inlet valve 14 is moved axially inwardly past its short stroke position. The pump assembly embodiment illustrated in FIGS. 16 to 18 has the advantage that it can be used to provide advantageous pumping in long stroke configurations after the pump has been used for short stroke configuration pumping. This pump assembly can be advantageous, for example, in automated pumps in which the stroke of the piston 16 may be desired to be changed from time to time so as, for example, to intentionally dispense different dosages of fluid. The dose of fluid to be dispensed can be varied to provide any dosage between a dosage representative of a short stroke and a dosage representative of a long stroke in which the spring member 256 is fully compressed. The piston 16 may be stroked in a desired manner to limit inward movement at some position between the short stroke position and the fully retracted long stroke position shown in FIG. 18.

The pump assemblies in accordance with the present invention have been particularly illustrated for use in a dispenser 70 with movement of the piston 16 provided by manual movement of a lever. Many other activation mechanisms may be provided including those which are manually activated and those which are activated by motors and the like such as in touchless dispensers in which an activator is moved and its movement controlled by an electric motor and a controller. With such automated control of movement of the piston, the dispenser may suitably select and vary stroke length for the piston.

Figure 19:
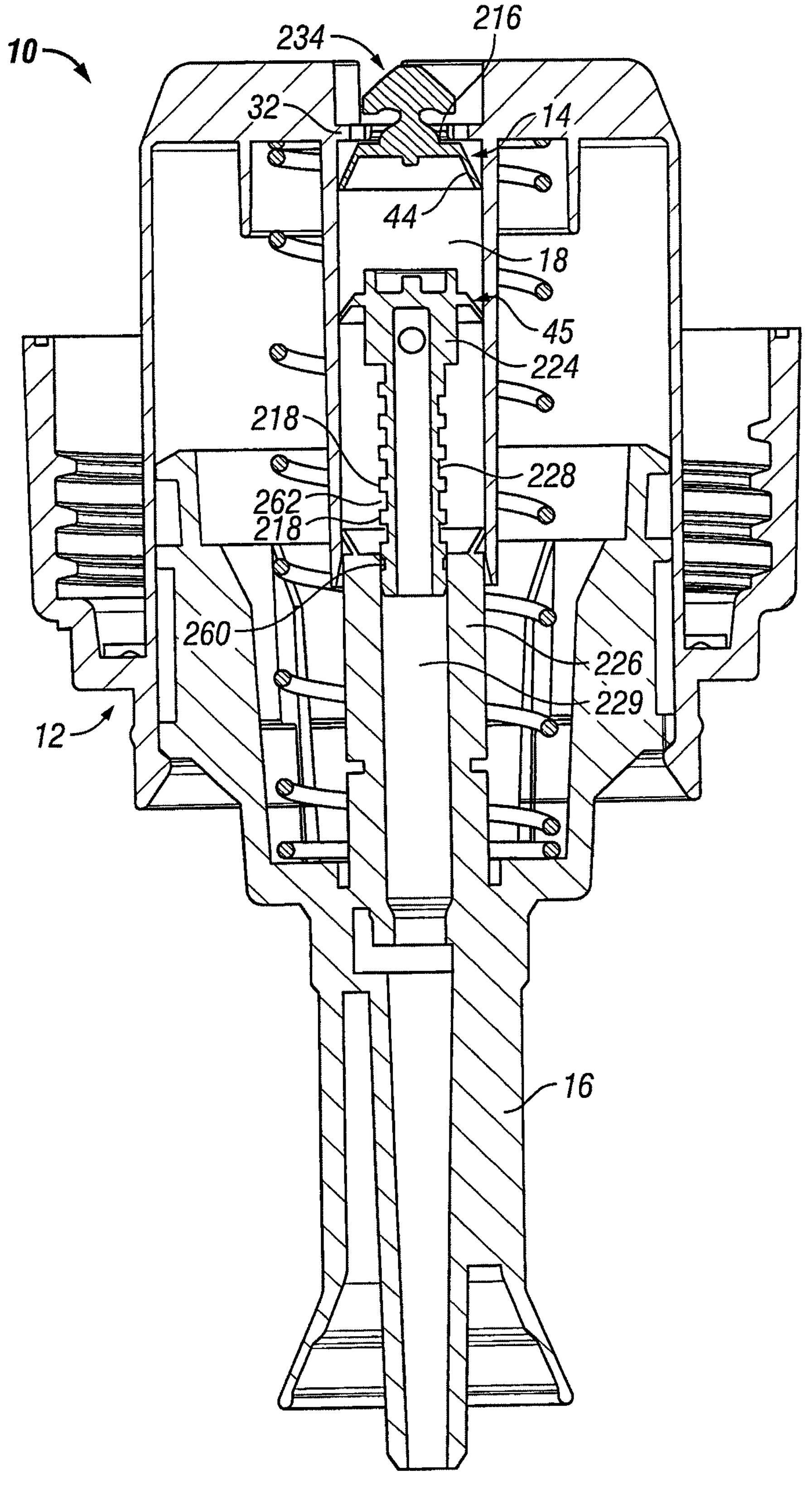
FIG. 19 is a cross-sectional side view of a fifth embodiment of a pump assembly in accordance with the present invention with the outlet valve in a short stroke position and the piston in a fully withdrawn position.
Figure 20:
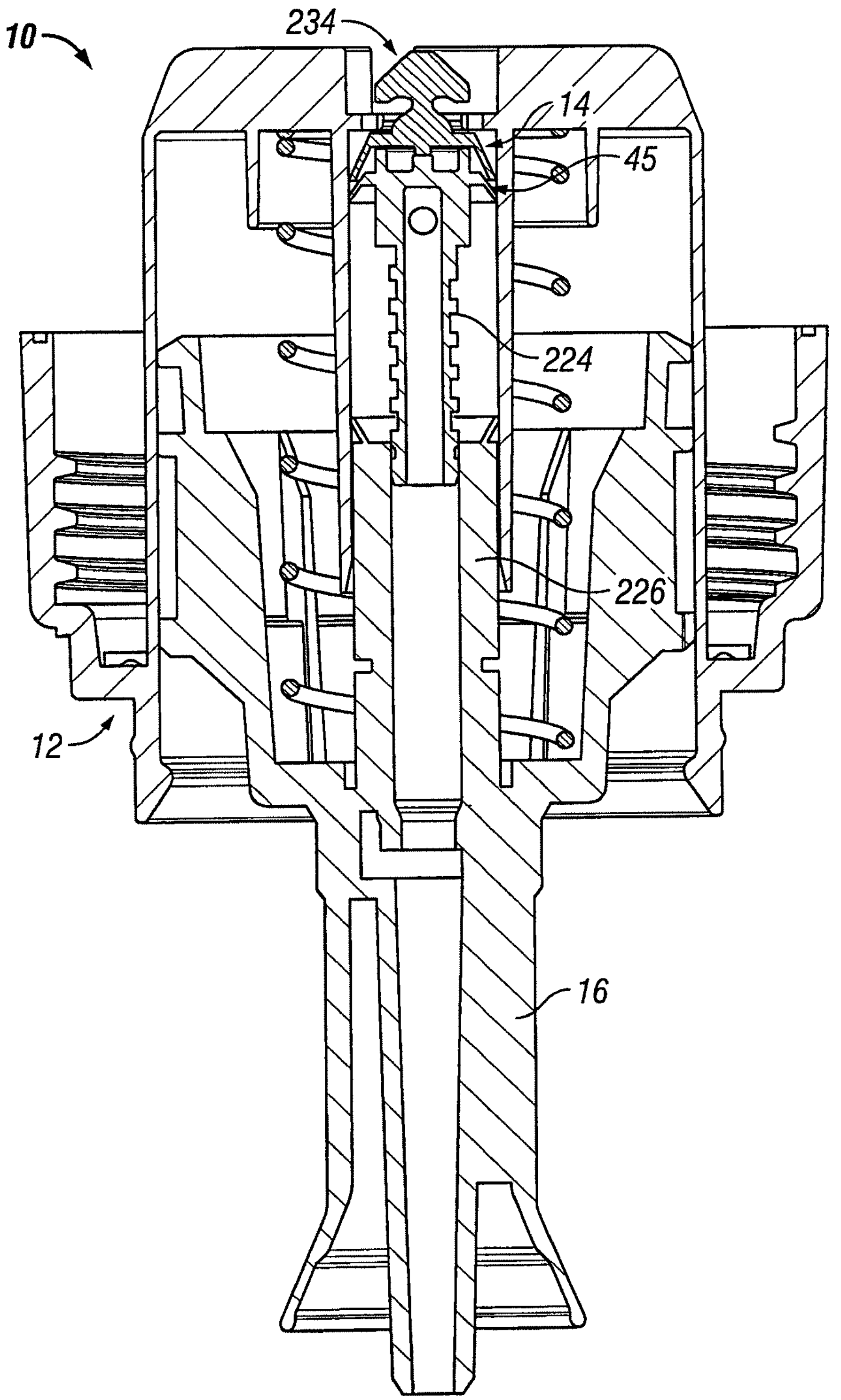
FIG. 20 is a cross-sectional side view the same as FIG. 19 with the outlet valve in the short stroke position but with the piston in a fully retracted position for a short stroke.

Reference is made to FIGS. 19 to 22 which illustrate a fifth embodiment of a pump assembly 10 in accordance with the present invention. The fifth embodiment is substantially identical to the fourth embodiment of FIGS. 16 to 18, however, with modification of the inlet valve and the piston. As seen in FIG. 19, the inlet valve 14 is provided secured in a central opening 216 of the shoulder 32 at the inner end 24 of the fluid chamber 18. The inlet valve 14 includes a button member 234 secured against removal in the central opening 216. The button member 234 carries the inlet flexing disc 44 inwardly of the shoulder 32. The inlet valve 14 is thus fixed against axial movement relative to the fluid chamber 18 and the body 12.

The piston 16 has been modified such that the inner portion 224 of the piston 16 which carries the outlet valve 45 is coaxially slidable relative to the outer portion 226 to a significant extent and in a frictionally engaged ratchet type manner.

As seen, the hollow tubular stem 228 of the inner piston portion 224 is adapted to be frictionally engaged within the coaxial bore 229 within the outer piston portion 226 of the piston 16. The stem 228 is frictionally engaged in the bore 229 by the bore 229 having a radially outwardly extending annular ring 260 adapted to engage in one of a number of channels 262 formed in the outer cylindrical surface of the stem 228 between radially outwardly extending annular rings 218 carried on the stem 228. The piston's inner portion 224 includes the outlet valve 45 carried on the outer end of the stem 228. The inner portion 224 is able to be frictionally engaged on the stem 228 in different axial positions.

Figure 21:
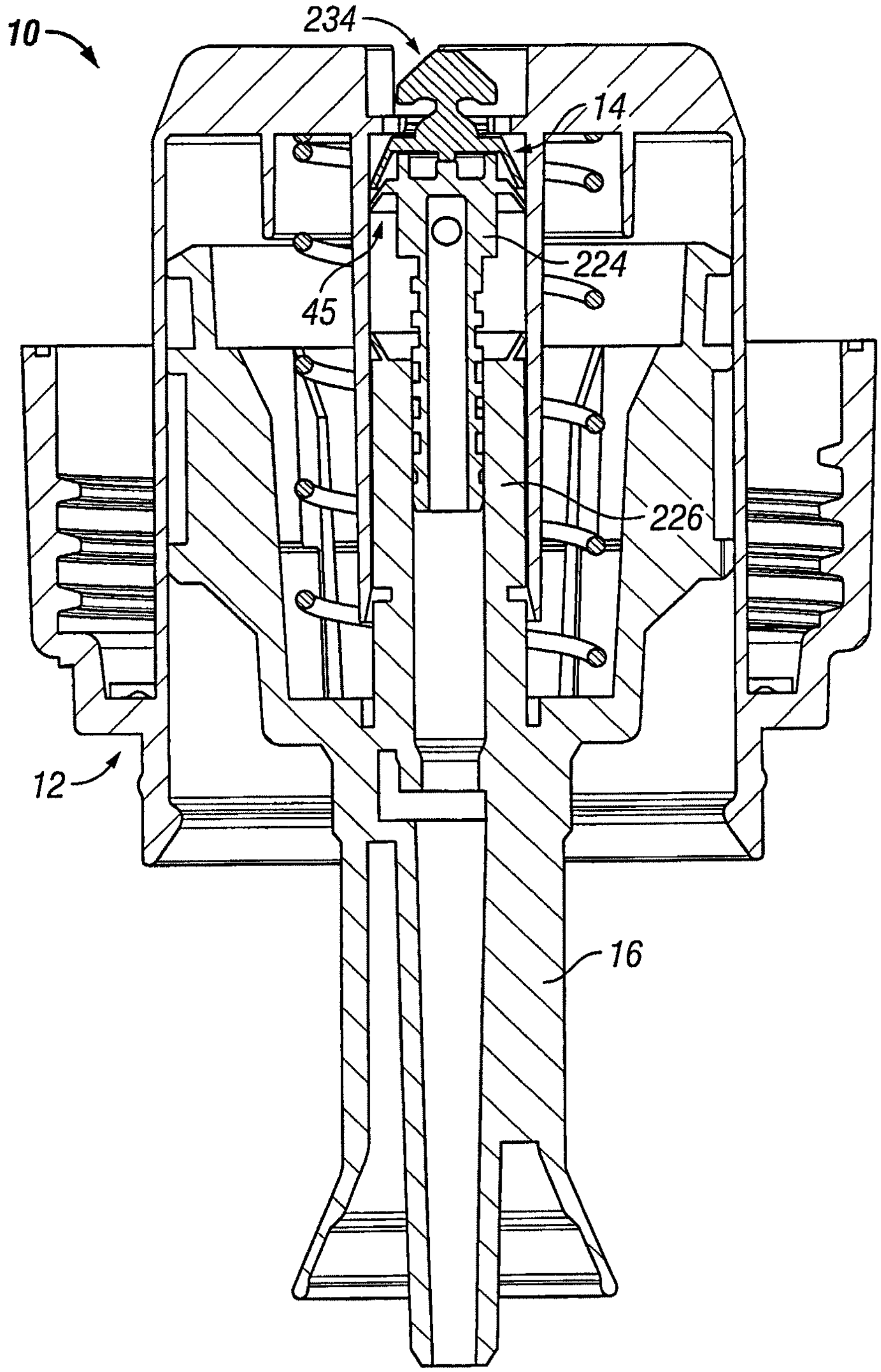
FIG. 21 is a cross-sectional side view similar to FIG. 19 but with the outlet valve carried on the piston in a long stroke position and the piston in a fully retracted position for a long stroke.
Figure 22:
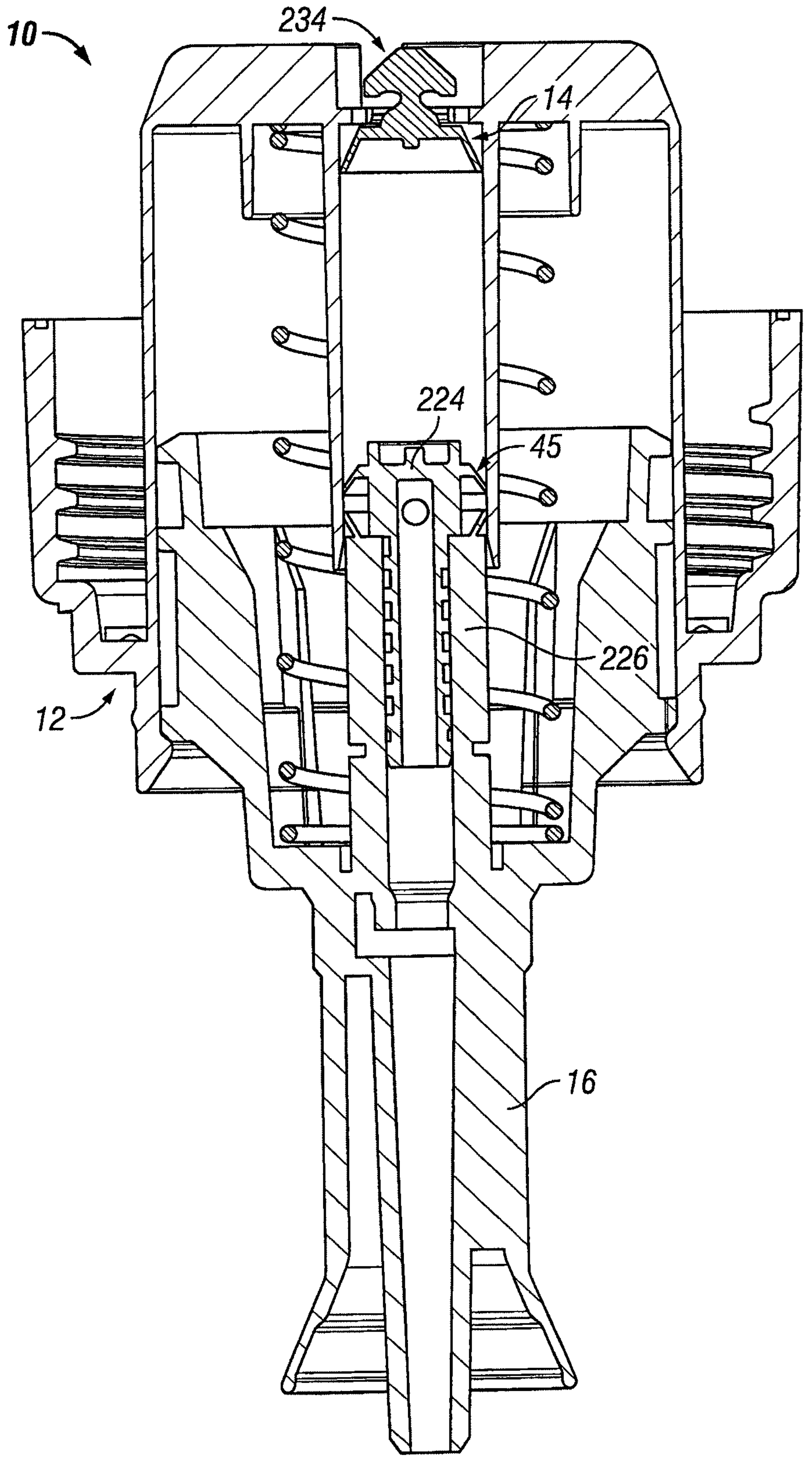
FIG. 22 is a cross-sectional side view the same as FIG. 21 with the outlet valve carried on the piston in a long stroke position but with the piston in a fully extended position.

As shown in FIG. 19, the pump assembly 10 is initially provided with the piston 16 having the inner portion 224 with one-way valve 16 in a short stroke position relative to the outer portion 226, namely, extended inwardly so as to increase the length of the piston 16. In short stroke operation, the piston 16 is moved from a fully extended position shown in FIG. 19 to a short stroke fully retracted position shown in FIG. 20 and suitable pumping action results by reciprocal movement of the piston between the positions of FIGS. 19 and 20. If, however, the piston is to be moved inwardly in the chamber 18 beyond the short stroke position shown in FIG. 19, the inner portion 224 comes to engage the inlet valve 16 and with such engagement further inward movement of the outer portion 226 moves the inner portion 224 outwardly relative to the outer portion 226 thus locating the inner portion 224 to the outer portion 226 at a telescoped position such as shown in FIG. 21 in which the inner portion 224 does not extend as far inwardly from the outer portion 226 as in the extended position in FIGS. 19 and 20. FIG. 21 illustrates a long stroke condition in which the inner portion 224 is fully retracted within the outer portion 226. FIG. 22 is the same as FIG. 21 but with the piston 16 in a fully extended position. In operation with a long stroke condition the piston 16 moves the inner portion 224 between the positions in FIGS. 21 and 22 and remains in a long stroke condition. In the fifth embodiment shown in FIGS. 19 and 22, once the inner portion 224 is moved inwardly past the short stroke position shown in FIG. 20, the piston 16 will come to have a shorter length.

As with the other embodiments, the frictional engagement between the inner portion 224 and the outer portion 226 is to be selected such that, other than when there is engagement between the inner portion 224 and the inlet valve 14, the inner portion 224 will remain in the same position relative to the outer portion 226 in movement of the piston 16 during normal operation of the pump.

Figure 23:
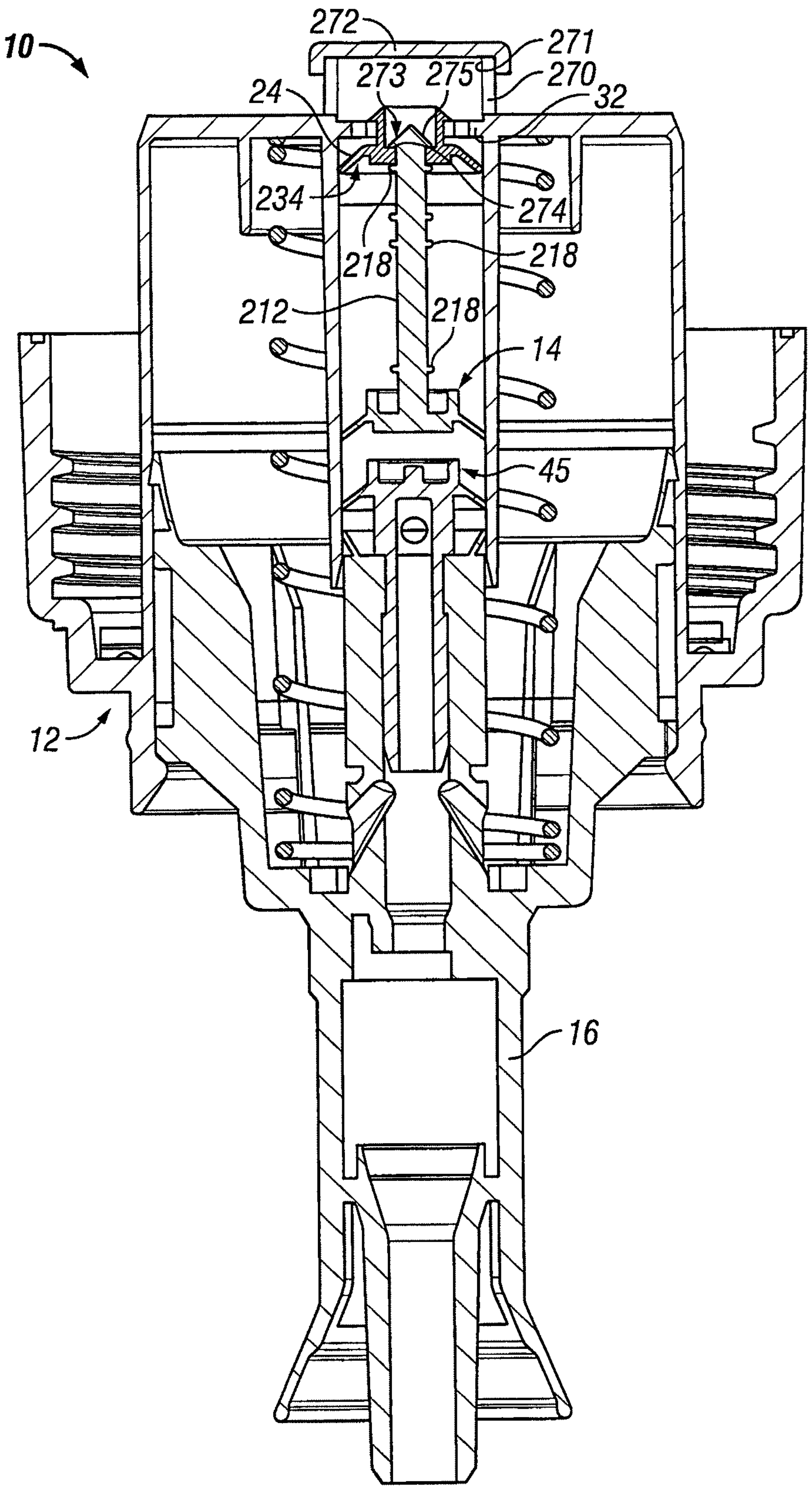
FIG. 23 is a partial cross-sectional side view of a sixth embodiment of a pump assembly in accordance with the present invention which is a modification of the third embodiment and shows the inlet valve in an initial position and the piston in a fully extended position.

Reference is made to FIG. 23 which illustrates a sixth embodiment of a pump assembly in accordance with the present invention. The pump assembly of FIG. 23 is identical to the pump assembly of the third embodiment in FIGS. 12 to 16 with the exception of providing the stem 212 of the inlet valve 14 to have a longer axial length, providing of an inlet tube 270 which extends inwardly on the shoulder 32 at the inner end 24 of the chamber and has an open inlet end 271, and providing a capping member 272 which closes the inlet end 271 of the inlet tube 270 against fluid flow.

For fluid to flow from the reservoir to the chamber 18, fluid must flow through the inlet tube 270. However, when the pump assembly 10 is supplied, fluid flow through the inlet tube 270 is prevented by the capping member 272.

The stem 212 carries near its innermost end an enlarged head 273 with an axially outwardly directed stop shoulder 274 to prevent axial sliding of the stem 212 outwardly from the end disc of the button member 234. The head 273 has an axially inwardly directed surface 275 to engage the capping member and displace it inwardly so as to permit fluid flow therepast. In FIG. 23, the capping member 272 is shown as secured to the inlet tube 270 in a snap-fit relation. Alternatively, the capping member may comprise a thin frangible member which can be ruptured by the head 273 moving inwardly.

Figure 24:
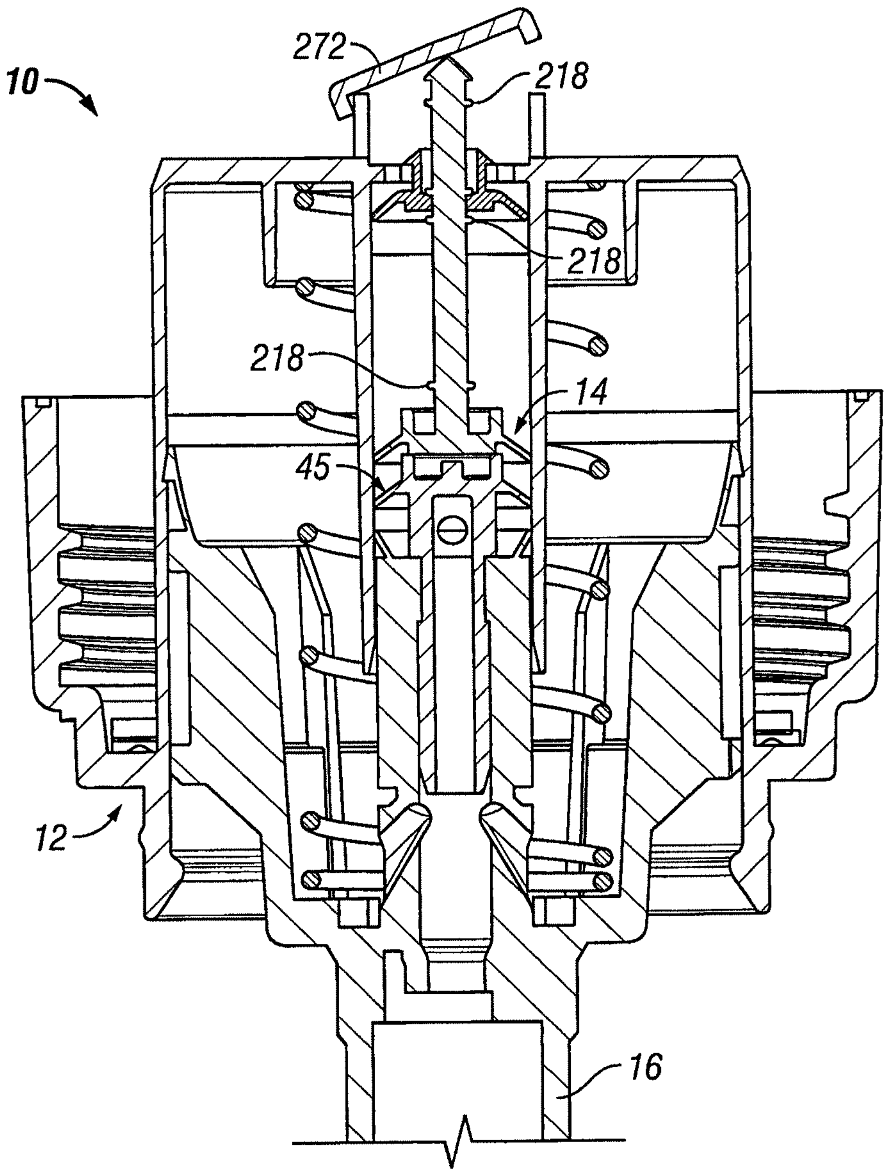
FIG. 24 is a partial cross-sectional side view the same as FIG. 23 but with the inlet valve in the short stroke position and the piston in a short stroke retracted position.

The pump assembly 10 of FIG. 23 is provided ready for use with the inlet valve 14 in an axial initial position as seen in FIG. 23 which is axially outwardly from the short stroke position shown in the embodiment of FIGS. 12 to 16 with the dispenser set up for short stroke operation. On initial inward movement of the piston 16, the inlet valve 14 is moved from the initial position to the short stroke position shown in FIG. 23 and in such movement, the head 273 displaces the capping member 272 and the inlet valve 14 assumes the short stroke position seen in FIG. 24 with the end disc captured between two additional annular rings 218 provided on the stem 212 at axial locations corresponding to the short stroke position in FIGS. 12 to 16.

While not illustrated in the embodiments, it is to be appreciated that a hybrid arrangement combining the features of a two-piece piston 16 as shown in the fifth embodiment of FIG. 19 to provide the outlet valve 45 movable relative to the remainder of the piston 16 can be combined with other features as illustrated in the first, second, third and fourth embodiments which illustrate an inlet valve 14 which is movable to different positions relative the body 12 and its chamber 18.

The first, second, third, fourth and fifth embodiments each have two principal movable elements, namely, the body 12 and the piston 16. In the first, second and third embodiments, the inlet valve 14 comprises a dose adjusting member being movable to different positions relative the body 12 acting as a base member to which the dose adjusting member is carried in the different positions. The piston 16 forms a setting member to engage the dose adjusting member and move it to different positions relative the base member. In the fifth embodiment, the outer valve 45 is the dose adjusting member, the piston 16 is the base member and the body 12 the setting member. In every embodiment, on inward sliding of the piston 16, in accordance with the present invention, engagement between the doe adjusting member and the setting member, the dose adjusting member coaxially slides relative the base member.

While the invention has been described with reference to preferred embodiments, many modifications and variations will now occur to persons skilled in the art. For a definition of the invention, reference is made to the following claims.

We claim:

1. A pump for dispensing liquids from a reservoir, comprising:

a piston-chamber forming body having a cylindrical chamber, said chamber having a chamber wall, an outer open end and an inner end in fluid communication with the reservoir, a piston forming element slidably received in the chamber having an inner end in the chamber and an outer end which extends outwardly from the open end of the chamber, a one-way inlet valve in the chamber inwardly of the piston forming element permitting fluid flow outwardly in the chamber past the inlet valve and preventing fluid flow inwardly in the chamber past the inlet valve, a one-way outlet valve carried on the piston forming element proximate the inner end of the piston forming element permitting fluid flow outwardly in the chamber past the outlet valve and preventing fluid flow inwardly in the chamber past the outlet valve, the inlet valve coaxially slidable inwardly in the chamber from an outer position displaced from the inner end of the chamber toward at least one inner position closer to the inner end of the chamber than the outer position, the inlet valve and the piston-chamber forming body coupled to each other in frictional engagement sufficient to prevent relative coaxial sliding of the inlet valve in the chamber under forces experienced due to pressures developed across the inlet valve in normal operation of the pump to dispense fluid, wherein on engagement of the inner end of the piston-forming element with the inlet valve, with the inlet valve in a position on the piston-chamber forming body axially outward of the inner position, while the inner end of the piston-forming element applies axially inwardly directed force to the inlet valve sufficient to coaxially slide the inlet valve inwardly overcoming the frictional engagement of the inlet valve and the piston chamber-forming body, the inlet valve slides coaxially inwardly with the inner end of the piston forming element relative the piston-chamber forming body toward the inner position, the inlet valve comprising a circular inlet flexing disc extending radially outwardly from a central support member, the circular inlet flexing disc having an elastically deformable edge portion proximate the chamber wall circumferentially thereabout, the circular inlet flexing disc substantially preventing fluid flow past the circular inlet flexing disc in an inward direction, and the circular inlet flexing disc elastically deforms away from the chamber wall to permit fluid flow past the circular inlet flexing disc in an outward direction.

2. A pump as claimed in claim 1 wherein:

the chamber having a stem guide opening coaxially therethrough, the central support member comprises a stem member which extends inwardly from the inlet flexing disc and coaxially through the stem guide opening, the stem member and the chamber about the stem guide opening engaging each other in frictional engagement sufficient to resist relative coaxial sliding of the inlet valve in the chamber under forces experienced due to pressures developed across the inlet valve in normal operation of the pump to dispense fluid, yet permit the inlet valve sufficient to coaxially slide the inlet valve inwardly when engaged by inner end of the piston forming element.

3. A pump as claimed in claim 2 wherein:

the inner end of the chamber having the stem guide opening coaxially therethrough, and the chamber wall provides the stem guide opening.

4. A pump as claimed in claim 2 wherein:

said piston forming element being generally cylindrical in cross-section with a central axially extending stem;

the outlet valve comprising a circular outlet flexing disc extending radially outwardly from the stem proximate the inner end of the piston forming element, the circular outlet flexing disc having an elastically deformable edge portion proximate the chamber wall circumferentially thereabout, the circular outlet flexing disc substantially preventing fluid flow past the circular outlet flexing, disc in an inward direction, and the circular outlet flexing disc elastically deforms away from the chamber wall to permit fluid flow past the circular outlet flexing disc in an outward direction.

5. A pump as claimed in claim 4 wherein:

the stem being hollow having a central passageway open at the outer end of the piston forming element forming an outlet and closed at an inner end;

a circular sealing disc extending radially outwardly from the stem spaced axially outwardly from the circular outlet flexing disc, the circular sealing disc engaging the chamber wall circumferentially thereabout to prevent fluid flow outwardly therepast, an inlet on the stem between the circular outlet flexing disc and circular sealing disc in communication with the passageway.

6. A pump as claimed in claim 5 wherein:

an engagement member on the stem outward of the chamber for engagement to move the piston forming element inwardly and outwardly.

7. A pump as claimed in claim 1 wherein:

in each of the outer position and the inner position the inlet valve and the piston-chamber forming body are in frictional engagement sufficient to prevent relative coaxial sliding of the inlet valve in the chamber under forces experienced due to pressures developed across the inlet valve in normal operation of the pump to dispense fluid.

8. A pump as claimed in claim 7 wherein:

with the inlet valve is in the outer position on engagement of the inner end of the piston forming element with the inlet valve and sliding of the piston forming element sufficiently inwardly, the piston forming element slides the inlet valve inwardly from the outer position to the inner position.

9. A pump for dispensing liquids from a reservoir, comprising:

a piston chamber-forming body having a cylindrical chamber, the chamber having a chamber wall, an outer open end and an inner end in fluid communication with the reservoir, a piston-forming element slidably received in the chamber having an inner end in the chamber and an outer end which extends outwardly from the open end of the chamber, an inlet valve in the chamber inwardly of the piston-forming element permitting fluid flow outwardly in the chamber past the inlet valve and preventing fluid flow inwardly in the chamber past the inlet valve, an outlet valve carried on the piston-forming element proximate the inner end of the piston forming element permitting fluid flow outwardly in the chamber past the outlet valve and preventing fluid flow inwardly in the chamber past the outlet valve, the inlet valve coaxially slidable inwardly in the chamber from an outer position displaced from the inner end of the chamber toward at least one inner position closer to the inner end of the chamber than the outer position, the inlet valve and the piston chamber-forming body coupled to each other to prevent relative coaxial sliding of the inlet valve in the chamber under forces experienced due to pressures developed across the inlet valve in normal operation of the pump to dispense fluid, wherein on engagement of the inner end of the piston forming element with the inlet valve, the inlet valve slides coaxially inwardly with the inner end of the piston forming element, the inlet valve coupled to the piston chamber-forming body by a spring member which biases the inlet valve axially outwardly to the outer position and is compressible to permit the inlet valve to slide inwardly to the at least one inner position, the spring member applying sufficient forces to prevent relative coaxial inward sliding of the inlet valve in the chamber under forces experienced due to pressures developed across the inlet valve in normal operation of the pump to dispense fluid, wherein on engagement of the inner end of the piston forming element with the inlet valve, the inlet valve coaxially slides inwardly from the outer position against the bias of the spring member with the inner end of the piston forming element, and on outward movement of the piston forming element the spring member biases the inlet valve to return to the outer position.

10. A pump as claimed in claim 9 wherein:

the spring member is a coiled spring coaxially disposed within the chamber, the spring having an inner end and an outer end, the inner end fixedly secured to the inner end of the chamber and the outer end fixedly secured to the inlet valve.

11. A pump as claimed in claim 9 wherein:

said piston-forming element being generally cylindrical in cross-section with a central axially extending stem;

the outlet valve comprising a circular flexing disc extending radially outwardly from the stem proximate the inner end of the piston forming element, the circular outlet flexing disc having an elastically deformable edge portion proximate the chamber wall circumferentially thereabout, the circular outlet flexing disc substantially preventing fluid flow past the flexing disc in an inward direction, and the circular outlet flexing disc elastically deforms away from the chamber wall to permit fluid flow past the circular outlet flexing disc in an outward direction.

12. A pump as claimed in claim 11 wherein:

the stem being hollow having a central passageway open at the outer end of the piston forming element forming an outlet and closed at an inner end;

a circular sealing disc extending radially outwardly from the stem spaced axially outwardly from the circular outlet flexing disc, the circular sealing disc engaging the chamber wall circumferentially thereabout to prevent fluid flow outwardly therepast, an inlet on the stem between the circular outlet flexing disc and circular sealing disc in communication with the passageway.

13. A pump for dispensing liquids from a reservoir, comprising:

a piston-chamber forming body having a cylindrical chamber, the chamber having a chamber wall, an outer open end and an inner end in fluid communication with the reservoir, a piston forming element slidably received in the chamber having an inner end in the chamber and an outer end which extends outwardly from the open end of the chamber, an inlet valve in the chamber inwardly of the piston forming element, the inlet valve comprising a one-way valve permitting fluid flow outwardly in the chamber past the inlet valve and preventing fluid flow inwardly in the chamber past the inlet valve, an outlet valve carried on the piston forming element proximate the inner end of the piston forming element, the outlet valve comprising a one-way valve permitting fluid flow outwardly in the chamber past the outlet valve and preventing fluid flow inwardly in the chamber past the outlet valve, the outlet valve coaxially slidable relative to the piston forming element outwardly relative the piston forming element from an inner position to an outer position which outer position is displaced inwardly from the outer end of the piston forming element a lesser extent than the inner position is displaced inwardly from the outer end of the piston forming element, the outlet valve and the piston forming element coupled to each other in frictional engagement sufficient to prevent relative coaxial sliding of the outlet valve relative the piston forming element under threes experienced due to pressures developed across the outlet valve in normal operation of the pump to dispense fluid, a stop member carried on the piston-chamber forming body axially inwardly of the outlet valve for engagement by the outlet valve to prevent axial sliding of the outlet valve inwardly relative the piston-chamber forming body, wherein on inward sliding of the piston forming element, with the outlet valve in a position on the piston forming element displaced inwardly from the outer end of the piston forming element a greater extent than the outer position, when there is engagement of the outlet valve with the stop member, while the piston forming element applies axially inwardly directed force to the outlet valve sufficient to coaxially slide the outlet valve outwardly overcoming the frictional engagement of the outlet valve and the piston forming element, the outlet valve coaxially slides outwardly relative the piston forming element toward the outer position.

14. A pump as claimed in claim 13 wherein:

the piston forming element comprising an inner piston portion and an outer piston portion, the outer piston portion having an inner end, the inner piston portion having an inner end, the outlet valve carried on the inner piston portion with the inner end of the inner piston portion inwardly of the inner end of the outer piston portion, the inner piston portion coaxially slidable relative to the outer piston portion outwardly relative the outer piston portion from the inner position to the outer position, in the outer position the inner end of the inner piston portion is displaced inwardly from the inner end of the outer piston portion a lesser extent than the inner end of the inner piston portion is displaced inwardly from the inner end of the outer piston portion in the inner position, the inner piston portion and the outer piston portion engaging each other to prevent relative coaxial sliding of the inner piston portion relative the outer piston portion under forces experienced due to pressures developed across the outlet valve in normal operation of the pump to dispense fluid, wherein on inward sliding of the outer piston portion which moves the inner piston portion inwardly, on engagement of the inner piston portion with the stop member, the inner piston portion coaxially slides outwardly relative the outer piston portion.

15. A pump as claimed in claim 14 wherein the stop comprises the inlet valve.

16. A pump as claimed in claim 13, wherein the stop member is carried by the inner end of the chamber.

17. A pump as claimed in claim 13 wherein:

the inlet valve comprising a circular inlet flexing disc extending radially outwardly from a central support member, the circular inlet flexing disc having an elastically deformable edge portion proximate the chamber wall circumferentially thereabout, the circular inlet flexing disc substantially preventing fluid flow past the circular inlet flexing disc in an inward direction, and the circular inlet flexing disc elastically deforms away from the chamber wall to permit fluid flow past the circular inlet flexing disc in an outward direction;

said outer piston portion being generally cylindrical in cross-section with a central bore therethrough having a bore wall, an inner end and outer end, the outlet valve comprising a circular outlet flexing disc extending radially outwardly from the proximate the inner end of the inner piston portion, the circular outlet flexing disc having an elastically deformable edge portion proximate the chamber wall circumferentially thereabout, the circular outlet flexing disc substantially preventing fluid flow past the circular outlet flexing disc in an inward direction, and the circular outlet flexing disc elastically deforms away from the chamber wall to permit fluid flow past the circular outlet flexing disc in an outward direction;

the inner piston portion having a hollow stem with an outer stem surface, the hollow stem having a central passageway open at the outer end of the inner piston portion forming an outlet and closed at an inner end;

a circular sealing disc extending radially outwardly from the outer piston portion spaced axially outwardly from the circular outlet flexing disc, the circular sealing disc engaging the chamber wall circumferentially thereabout to prevent fluid flow outwardly therepast, an inlet between the circular outlet flexing disc and the circular sealing disc in communication with the passageway;

the hollow stem of the inner piston portion coaxially received in the bore of the outer piston portion with the outlet circular flexing disc inward, of the inner end of the bore and the outer end of the central passageway opening into the bore, in each of the inner position and the outer position, the inner piston portion and the Outer piston portion are in frictional engagement between the outer stem surface of the inner piston portion and the bore wall sufficient to prevent relative coaxial sliding of the inner piston portion relative the outer piston portion under forces experienced due to pressures developed across the outlet valve in normal operation of the pump to dispense fluid.

18. A pump for dispensing liquids from a reservoir, comprising:

a piston chamber forming body having a cylindrical chamber, the chamber having a chamber wall, an outer open end and an inner end in fluid communication with the reservoir, a piston forming element slidably received in the chamber having an inner end in the chamber and an outer end which extends outwardly from the open end of the chamber, an inlet valve in the chamber inwardly of the piston forming element, the inlet valve comprising a one-way valve permitting fluid flow outwardly in the chamber past the inlet valve and preventing fluid flow inwardly in the chamber past the inlet valve, an outlet valve carried on the piston forming element proximate the inner end of the piston forming element, the outlet valve comprising a one-way valve permitting fluid flow outwardly in the chamber past the outlet valve and preventing fluid flow inwardly in the chamber past the outlet valve, wherein one of the inlet valve and the outlet valve comprises a dose adjusting member, one of the piston chamber forming body and the piston forming element comprising a base member, and the other of the piston chamber forming body and the piston forming element comprising a setting member, (a) when the inlet valve comprises the dose adjusting member, the base member comprises the piston chamber forming body, then (i) the inlet valve is coaxially slidable inwardly in the chamber from an outer position displaced from the inner end of the chamber toward at least one inner position closer to the inner end of the chamber than the outer position, and (ii) the inlet valve and the piston chamber forming body are coupled to each other to prevent relative coaxial sliding of the inlet valve in the chamber under forces experienced due to pressures developed across the inlet valve in normal operation of the pump to dispense fluid, (b) when the outlet valve comprises the dose adjusting member and the base member comprises the piston forming element, then (i) the outlet valve is coaxially slidable relative to the piston forming element outwardly relative the piston forming element from an inner position to an outer position said outer position is displaced inwardly from the outer end of the piston forming element a lesser extent than the inner position is displaced inwardly from the outer end of the piston forming element, and (ii) the outlet valve and the piston forming element engaging each other to prevent relative coaxial sliding of the outlet valve relative the piston forming element under forces experienced due to pressures developed across the outlet valve in normal operation of the pump to dispense fluid, wherein on inward sliding of the piston forming element, with engagement between the dose adjusting member and the setting member, the dose adjusting member slides coaxially relative the base member.

19. A pump as claimed in claim 18 wherein the dose adjusting member and the base member are coupled in frictional engagement to each other sufficient to prevent relative coaxial sliding of the dose adjusting member relative the base member under forces experienced due to pressures developed across the dose adjusting member in normal operation of the pump to dispense fluid, and wherein the frictional engagement is provided by a ratchet type frictional fit resistance structure which permits the dose adjusting member and the base member to be frictionally located at different relative axial positions.

* * * * *